(12) United States Patent
Takayoshi et al.

(10) Patent No.: US 12,541,837 B2
(45) Date of Patent: Feb. 3, 2026

(54) ETCHING PROCESSING SYSTEM, METHOD OF PREDICTING ETCHING QUALITY, AND NON-TRANSITORY STORAGE MEDIUM OF ETCHING QUALITY PREDICTION STORING A PROGRAM CAUSING A COMPUTER TO IMPLEMENT A PREDICTION

(71) Applicant: Tokyo Electron Limited, Tokyo (JP)

(72) Inventors: Joji Takayoshi, Miyagi (JP); Hidehiko Sato, Miyagi (JP); Yuri Kimura, Miyagi (JP); Hirokazu Kyokane, Yamanashi (JP)

(73) Assignee: Tokyo Electron Limited, Tokyo (JP)

(*) Notice: Subject to any disclaimer, the term of this patent is extended or adjusted under 35 U.S.C. 154(b) by 409 days.

(21) Appl. No.: 18/179,626

(22) Filed: Mar. 7, 2023

(65) Prior Publication Data

US 2023/0206418 A1 Jun. 29, 2023

Related U.S. Application Data

(63) Continuation of application No. PCT/JP2022/037299, filed on Oct. 5, 2022.

(30) Foreign Application Priority Data

Oct. 8, 2021 (JP) ................... 2021-166079

(51) Int. Cl.
*G06T 7/00* (2017.01)
(52) U.S. Cl.
CPC .. *G06T 7/0004* (2013.01); *G06T 2207/10024* (2013.01); *G06T 2207/20081* (2013.01); *G06T 2207/30148* (2013.01)
(58) Field of Classification Search
None
See application file for complete search history.

(56) References Cited

U.S. PATENT DOCUMENTS

| | | | |
|---|---|---|---|
| 10,955,832 B2 | 3/2021 | Banna | |
| 2019/0004504 A1* | 1/2019 | Yati | H01L 22/20 |
| 2021/0143039 A1 | 5/2021 | Hemani et al. | |
| 2021/0405521 A1* | 12/2021 | Kim | G03F 7/70625 |
| 2022/0375063 A1* | 11/2022 | Pisarenco | G03F 7/705 |
| 2022/0399215 A1* | 12/2022 | Han | H01L 21/67069 |
| 2023/0062206 A1* | 3/2023 | Li | G03F 7/705 |

* cited by examiner

*Primary Examiner* — Leon Viet Q Nguyen
(74) *Attorney, Agent, or Firm* — IPUSA, PLLC

(57) ABSTRACT

An etching processing system includes a memory, and a processor coupled to the memory and configured to predict etching quality of a substrate by inputting image data of the substrate into a trained model trained by using training data in which image data of substrates captured by an imaging device arranged on a transfer path of the substrates and information for predicting etching quality of the substrates are associated with each other.

9 Claims, 20 Drawing Sheets

FIG.5
| TRAINING DATA ||
|---|---|
| INPUT DATA | SUPERVISORY DATA |
| POST-PROCESS IMAGE DATA 1 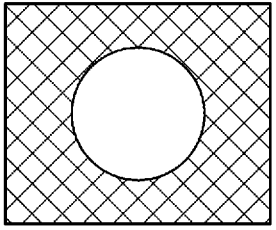 | ETCHING QUALITY INFORMATION 1 |
| POST-PROCESS IMAGE DATA 2 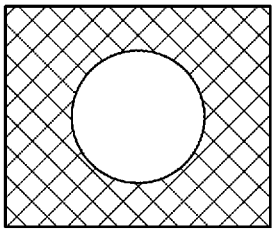 | ETCHING QUALITY INFORMATION 2 |

FIG.12

| TRAINING DATA | | | |
|---|---|---|---|
| ACQUIRED IMAGE DATA | INPUT DATA | ACQUIRED QUALITY INFORMATION | SUPERVISORY DATA |
| PRE-PROCESS IMAGE DATA 1 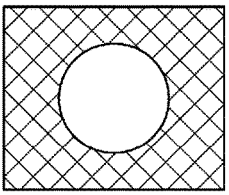 | DIFFERENTIAL IMAGE DATA 1 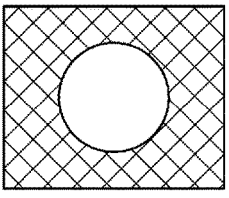 | PRE-PROCESS QUALITY INFORMATION 1 | ETCHING QUALITY INFORMATION 1 |
| POST-PROCESS IMAGE DATA 1 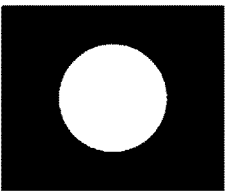 | | POST-PROCESS QUALITY INFORMATION 1 | |
| PRE-PROCESS IMAGE DATA 2 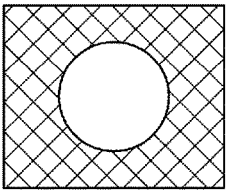 | DIFFERENTIAL IMAGE DATA 2 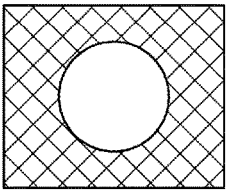 | PRE-PROCESS QUALITY INFORMATION 2 | ETCHING QUALITY INFORMATION 2 |
| POST-PROCESS IMAGE DATA 2 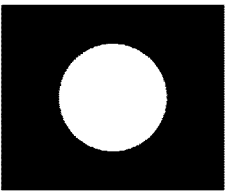 | | POST-PROCESS QUALITY INFORMATION 2 | |

FIG.17
| TRAINING DATA 1710 ||
|---|---|
| INPUT DATA | SUPERVISORY DATA |
| PRE-PROCESS IMAGE DATA 1 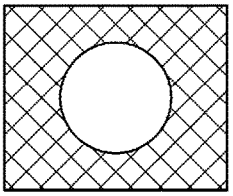 | PRE-PROCESS QUALITY INFORMATION 1 |
| PRE-PROCESS IMAGE DATA 2 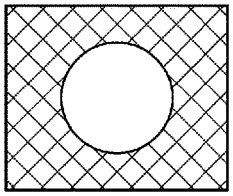 | PRE-PROCESS QUALITY INFORMATION 2 |
| TRAINING DATA 1720 ||
|---|---|
| INPUT DATA | SUPERVISORY DATA |
| POST-PROCESS IMAGE DATA 1 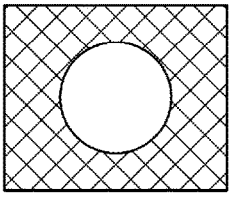 | POST-PROCESS QUALITY INFORMATION 1 |
| POST-PROCESS IMAGE DATA 2 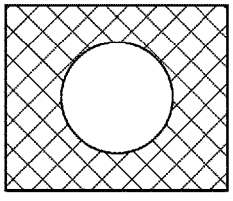 | POST-PROCESS QUALITY INFORMATION 2 |

ETCHING PROCESSING SYSTEM, METHOD OF PREDICTING ETCHING QUALITY, AND NON-TRANSITORY STORAGE MEDIUM OF ETCHING QUALITY PREDICTION STORING A PROGRAM CAUSING A COMPUTER TO IMPLEMENT A PREDICTION

CROSS-REFERENCE TO RELATED APPLICATION

This U.S. non-provisional application is a continuation application of and claims the benefit of priority under 35 U.S.C. § 365(c) from PCT International Application PCT/JP2022/037299 filed on Oct. 5, 2022, which designates the U.S., and is based upon and claims priority to Japanese Patent Application No. 2021-166079 filed on Oct. 8, 2021, the entire contents of which are incorporated herein by reference.

BACKGROUND OF THE INVENTION

1. Field of the Invention

The present disclosure relates to an etching processing system, a method of predicting an etching quality, and an etching quality prediction program.

2. Description of the Related Art

In a manufacturing process of a substrate, for example, various inspections are performed on an etched substrate. Among them, an external inspection device is generally used for inspection of so-called etching quality (also referred to as etching performance) such as a Critical Dimension (CD) value and an etching amount. Therefore, it takes a certain amount of time for the etching processing system to acquire the inspection result of the substrate after undergoing etching.

For this reason, in the current etching processing system, for example, it is difficult to control to feedback the inspection result of the etching quality to the etching processing of the next substrate.

PRIOR ART DOCUMENT

Patent Document

[Patent Document 1] U.S. Patent Application Publication No. 2021/0143039
[Patent Document 2] U.S. Pat. No. 10,955,832

SUMMARY OF THE INVENTION

The present disclosure reduces the time until the inspection result of the etching quality is obtained.

An etching processing system according to an aspect of the present disclosure includes the following configuration. An etching processing system includes a memory, and a processor coupled to the memory and configured to predict etching quality of a substrate by inputting image data of the substrate into a trained model trained by using training data in which image data of substrates captured by an imaging device arranged on a transfer path of the substrates and information for predicting etching quality of the substrates are associated with each other.

The present disclosure reduces the time until the inspection result of the etching quality is obtained.

BRIEF DESCRIPTION OF THE DRAWINGS

FIG. 5 is a first diagram illustrating a specific example of training data;

FIG. 12 is a second diagram illustrating a specific example of training data;

FIG. 17 is a third diagram illustrating a specific example of training data;

DESCRIPTION OF THE PREFERRED EMBODIMENTS

Figure 1:
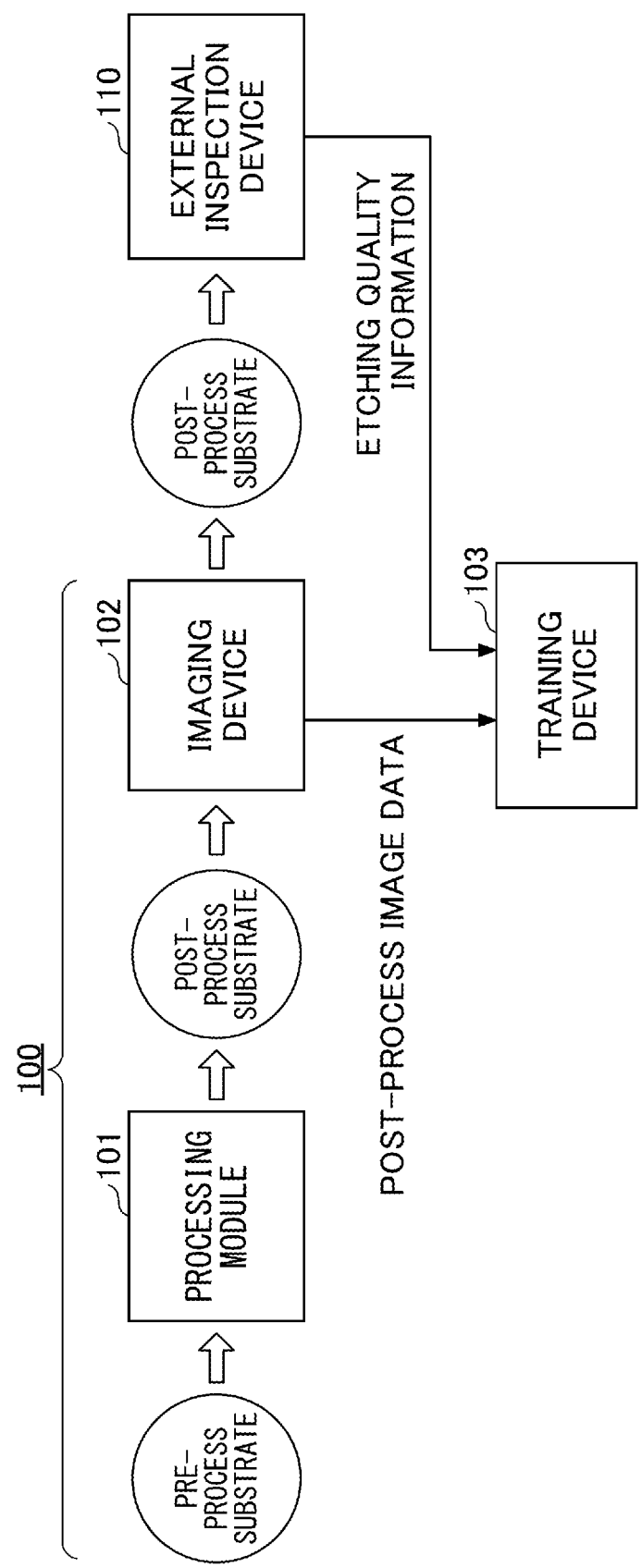
FIG. 1 is a first diagram illustrating an example of a system configuration of an etching processing system in a training phase.

Hereinafter, embodiments will be described with reference to the accompanying drawings. In this specification and the drawings, components having substantially the same functional configuration are denoted by the same reference numerals, and redundant description thereof will be omitted.

First Embodiment

<System Configuration of Etching Processing System>

First, the system configuration of the etching processing system according to the first embodiment will be described separately for the training phase and the prediction phase.

(1) In the Case of Training Phase

FIG. 1 is a first diagram illustrating an example of a system configuration of an etching processing system in a training phase. As illustrated in FIG. 1, the etching processing system 100 in the training phase includes a processing module 101, an imaging device 102, and a training device 103.

The example of FIG. 1 illustrates a state in which a pre-process substrate is transported on a transfer path in the etching processing system 100, is subjected to etching processing in the processing module 101, is transported on the transfer path as a post-process substrate, is imaged by the imaging device 102, and is then transported out.

Among them, the processing module 101 performs the etching process on the pre-process substrate accommodated therein to generate the post-process substrate.

The imaging device 102 is disposed on the transfer path in the etching processing system 100, and in the present embodiment, an image of the post-process substrate is taken to generate post-process image data. Further, the imaging device 102 transmits the generated post-process image data to the training device 103. It is assumed that the post-process image data generated by the imaging device 102 is image data including a plurality of color components (for example, an R component, a G component, and a B component).

The training device 103 acquires the post-process image data transmitted from the imaging device 102, and acquires the etching quality information output when the external inspection device 110 performs the inspection of the etching quality on the post-process substrate.

In addition, the training device 103 generates training data in which the post-process image data and the etching quality information are associated with each other, and performs training of a model using the generated training data, thereby generating a trained model. Furthermore, the training device 103 sets a model parameter of the generated trained model in a prediction device to be described later.

The external inspection device 110 inspects the etching quality of the post-process substrate transported out from the etching processing system 100. In the external inspection device 110 according to the present embodiment, as the inspection of the etching quality, for example, an absolute value indicating the result of etching is measured and etching quality information is generated. The absolute value indicating the etching result includes, for example, any one of a film thickness value, a critical dimension (CD) value, a value related to a cross-sectional shape of the substrate, and the like.

(2) In Case of Prediction Phase

Figure 2:
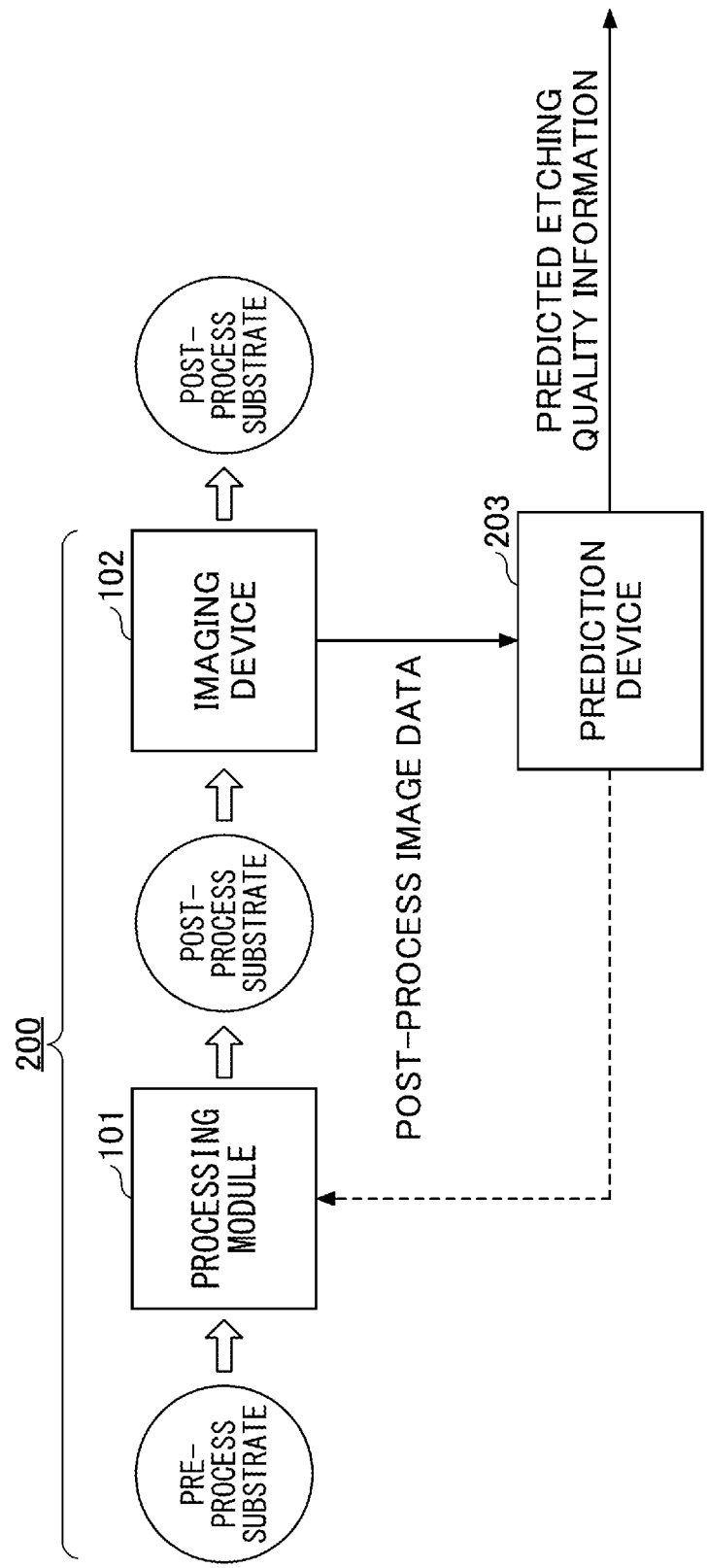
FIG. 2 is a first diagram illustrating an example of a system configuration of an etching processing system in a prediction phase.

FIG. 2 is a first diagram illustrating an example of a system configuration of the etching processing system in the prediction phase. As illustrated in FIG. 2, the etching processing system 200 in the prediction phase includes a processing module 101, an imaging device 102, and a prediction device 203.

The example of FIG. 2 illustrates a state in which the pre-process substrate is transported on the transfer path in the etching processing system 200, and is subjected to the etching processing in the processing module 101, followed by being transported on the transfer path as the post-process substrate. An image of the post-process substrate is taken by the imaging device 102, and is then transported out.

As in the training phase, the processing module 101 performs an etching process on the stored pre-process substrate to generate a post-process substrate.

The imaging device 102 is disposed on the transfer path in the etching processing system 200, and in the present embodiment, an image of the post-process substrate is taken to generate post-process image data. Further, the imaging device 102 transmits the generated post-process image data to the prediction device 203.

The prediction device 203 predicts the etching quality by inputting the post-process image data transmitted from the imaging device 102 to the trained model, and the predicted etching quality information is output.

As described above, according to the etching processing system 200, the etching quality can be predicted and the predicted etching quality information can be output every time one pre-process substrate is etched. Thus, as compared with the case where the external inspection device inspects the etching quality and outputs the etching quality information, the time in which the etching processing system acquires the inspection result of the etching quality can be significantly reduced.

As a result, according to the etching processing system 200, it is possible to control to feedback the inspection result of the etching quality to the etching processing of the next pre-process substrate in the processing module 101 (see the dotted line).

<Arrangement Example of Imaging Device>

Figure 3:
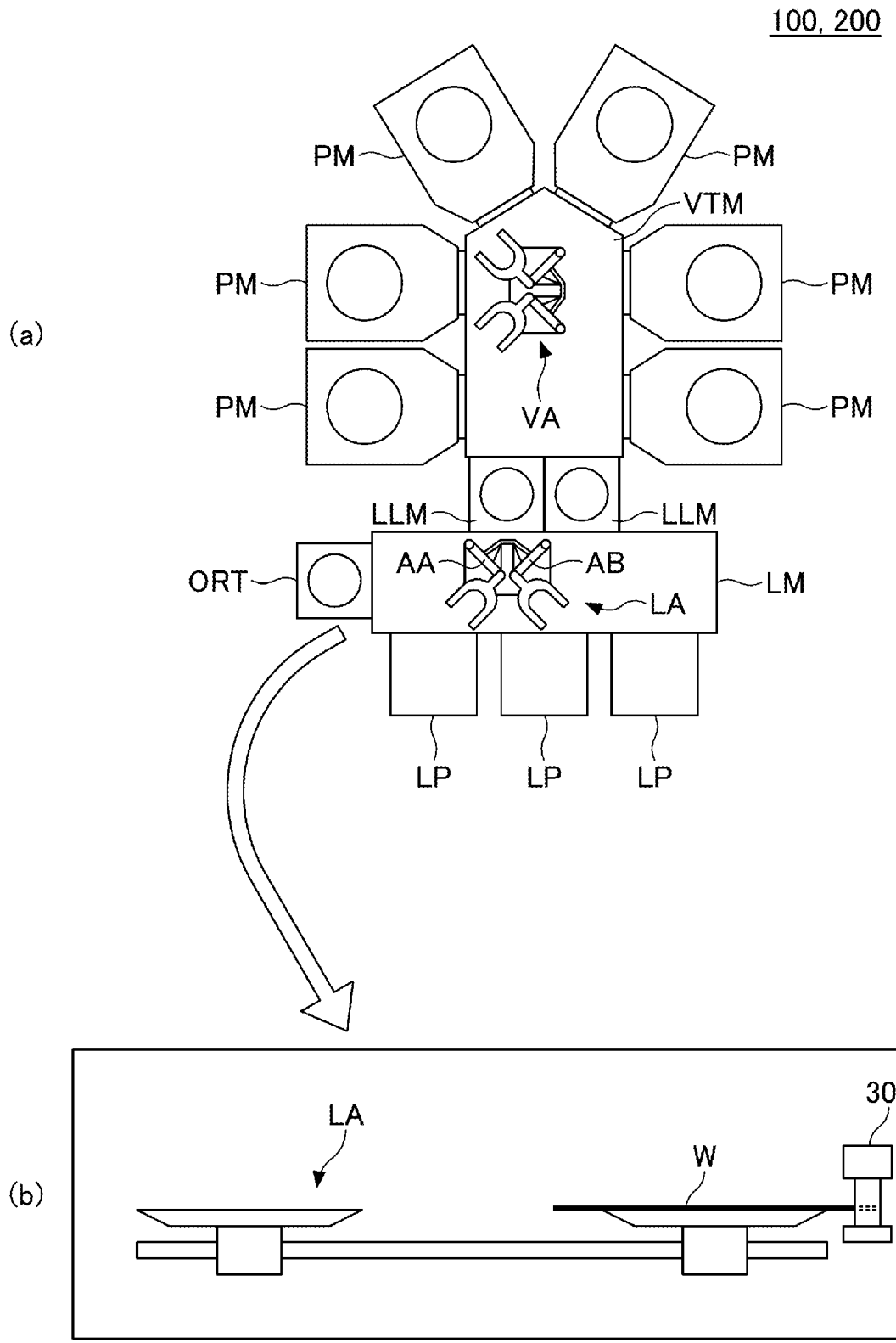
FIG. 3 is a diagram illustrating an arrangement example of an imaging device in the etching processing system.

Next, an arrangement example of the imaging device 102 in the etching processing system 100 or 200 will be described. FIG. 3 is a diagram illustrating an arrangement example of the imaging device. FIG. 3(a) is a diagram illustrating a module configuration of the entire etching processing system 100 or 200.

Here, before describing an arrangement example of the imaging device 102, first, a module configuration of the entire etching processing system 100 or 200 including a specific module in which the imaging device 102 is arranged will be briefly described.

As illustrated in FIG. 3(a), the etching processing system 100 or 200 may include, for example Six processing modules PM (Process Modules);
A transfer module VTM (Vacuum Transfer Module);
Two load lock modules LLM (Load Lock Module);
A loader module (Loader Module); and
Three load ports LP (Load Port).

The six processing modules PM are arranged around the transfer module VTM and perform etching processing on the pre-process substrate. The processing module 101 illustrated in FIG. 1 or 2 indicates any one of the six processing modules PM.

A transfer device VA is disposed inside the transfer module VTM to transfer the pre-process substrate from the two load lock modules LLM to the six processing modules PM and to transfer the post-process substrate subjected to the etching processing from the six processing modules PM to the load lock module LLM.

The load lock module LLM is provided between the transfer module VTM and the loader module LM, and switches between an air atmosphere and a vacuum atmosphere.

Inside the loader module LM, a transfer device LA for transferring the pre-process substrate or the post-process substrate is disposed. The transfer device LA transfers pre-process substrates accommodated in Front Opening Unified Pods (FOUP) attached to each load port LP to the two load lock modules LLM. Further, the transfer device LA transfers the post-process substrate from the two load lock modules LLM to the empty FOUP attached to each load port LP. That is, the load port LP transfers the pre-process substrate, and serves as an entrance for transferring the pre-process substrate.

The loader module LM is provided with an orienter ORT for aligning the position of the pre-process substrate. The orienter ORT detects the center position, the amount of eccentricity, and the notch position of the pre-process substrate. The correction of the pre-process substrate based on the detection result in the orienter ORT is performed using robot arms AA and AB of the loader module LM.

FIG. 3(b) is a diagram schematically illustrating the inside of the orienter ORT in which the imaging device 102 is disposed. As illustrated in FIG. 3(b), the imaging device 102 is disposed, for example, in the vicinity of a detector 301 that detects the notch position of the pre-process substrate (reference symbol W).

As described above, when the imaging device 102 is disposed on the transfer path in the etching processing system 100 or 200, the imaging device 102 can capture an image of the post-process substrate subjected to the etching processing (or the pre-process substrate before undergoing etching).

<Hardware Configuration of Training Device and Prediction Device>

Next, hardware configurations of the training device 103 and the prediction device 203 will be described. Since the training device 103 and the prediction device 203 have the same hardware configuration in the present embodiment, the hardware configuration of the training device 103 will be described here.

Figure 4:
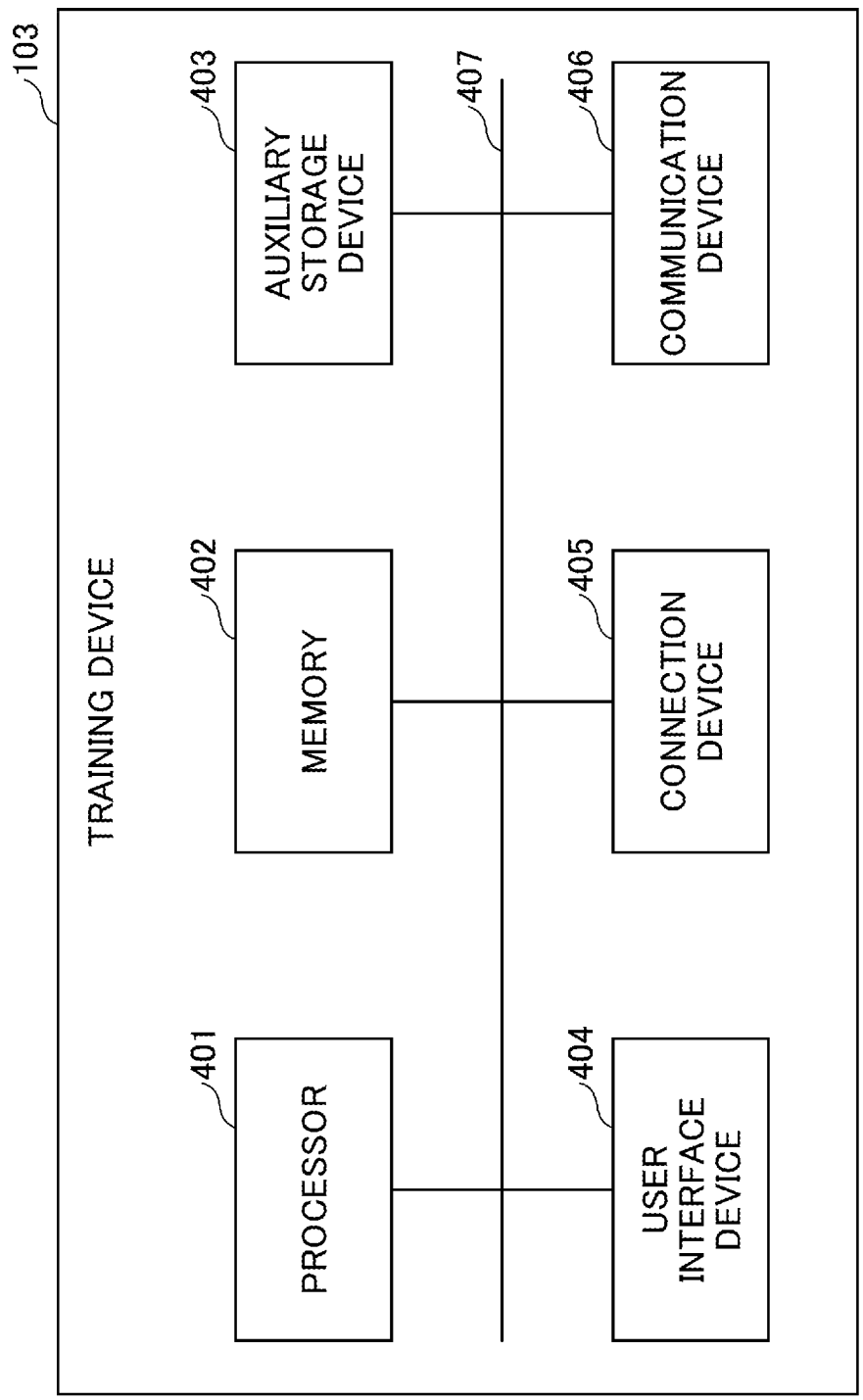
FIG. 4 is a diagram illustrating an example of a hardware configuration of the training device.

FIG. 4 is a diagram illustrating an example of a hardware configuration of the training device. As illustrated in FIG. 4, the training device 103 includes a processor 401, a memory 402, an auxiliary storage device 403, a user interface device 404, a connection device 405, and a communication device 406. The hardware components of the training device 103 are connected to each other via a bus 407.

The processor 401 includes various computing devices such as a Central Processing Unit (CPU) and a Graphics Processing Unit (GPU). The processor 401 reads various programs (for example, a training program or the like) onto the memory 402 and executes the programs.

The memory 402 includes a main storage device such as a Read Only Memory (ROM), a Random Access Memory (RAM), and the like. The processor 401 and the memory 402 form a so-called computer, and the computer realizes various functions by the processor 401 executing various programs read out on the memory 402.

The auxiliary storage device 403 stores various programs and various data used when the various programs are executed by the processor 401. A training data storage section 620 described below is implemented in the auxiliary storage device 403.

The user interface device 404 includes, for example, a keyboard or a touch panel through which a user of the training device 103 performs an input operation of various commands or the like, or a display device that displays an internal state of the training device 103 to the user.

The connection device 405 is a connection device connected to each unit (for example, the imaging device 102 or the like) in the etching processing system 100. The communication device 406 is a communication device for communicating with an external device (not illustrated) via a network.

<Specific Example of Training Data>

Next, a specific example of training data generated by the training device 103 will be described. FIG. 5 is a first diagram illustrating a specific example of training data. As illustrated in FIG. 5, training data 500 includes "input data" and "supervisory data" as information items.

The "input data" stores post-process image data generated by capturing an image of the etched post-process substrate in the processing module 101 by the imaging device 102. In the example of FIG. 5, file names="post-process image data 1", "post-process image data 2", and the like are stored as the post-process image data.

In the "supervisory data", the etching quality information output when the etched post-process substrate in the processing module 101 is transferred out and the inspection of the etching quality is performed in the external inspection device 110 is stored in association with the post-process image data. In the example of FIG. 5, as the etching quality information, file names="etching quality information 1", "etching quality information 2", and the like are stored in association with file names="post-process image data 1", "post-process image data 2", and the like.

<Functional Configuration of Training Device>

Figure 6:
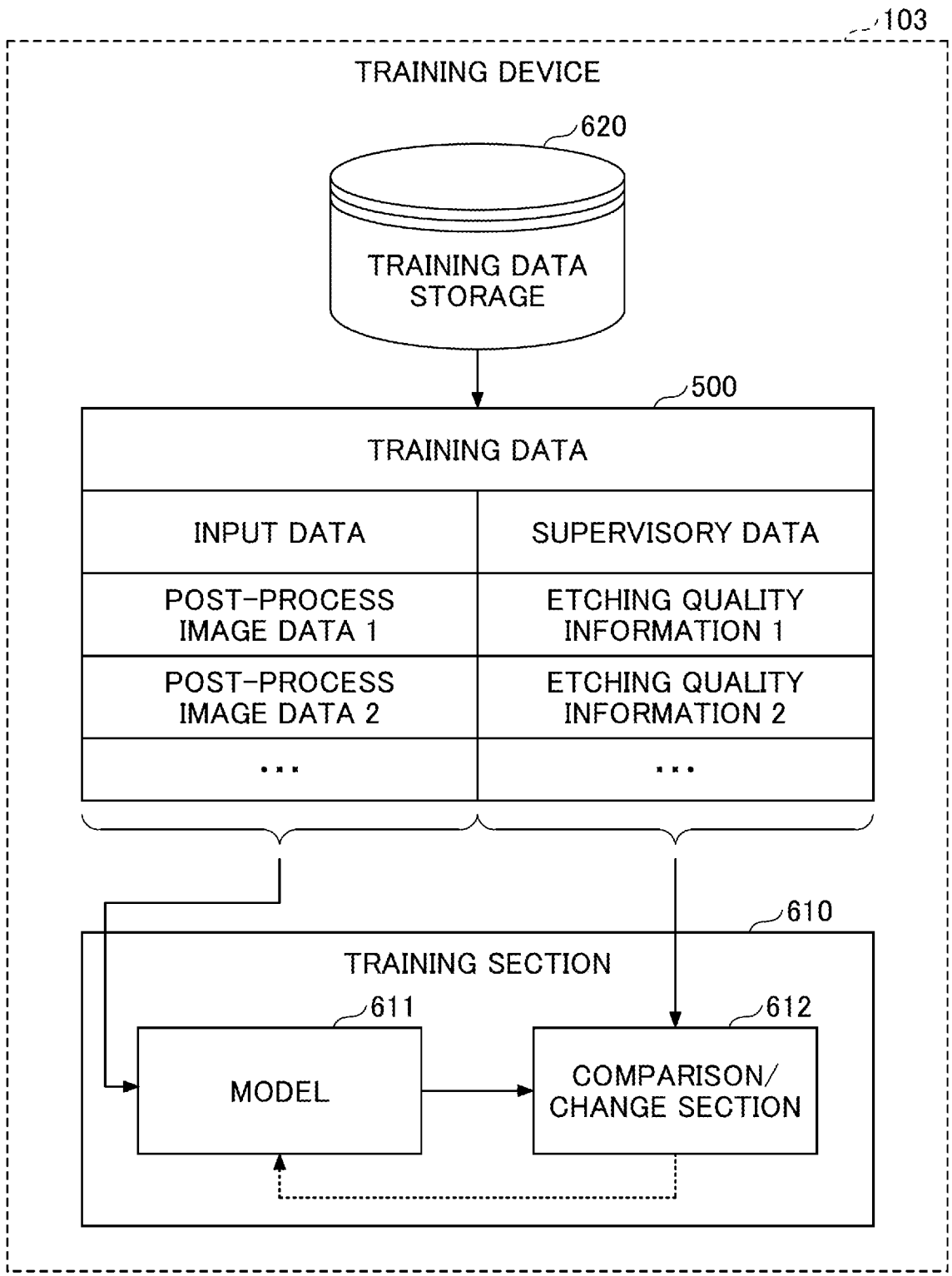
FIG. 6 is a first diagram illustrating an example of a functional configuration of a training device.

Next, a functional configuration of the training device 103 will be described. FIG. 6 is a first diagram illustrating an example of a functional configuration of the training device. As described above, the training program is installed in the training device 103, and the training device 103 functions as a training section 610 by executing the program.

The training section 610 includes a model 611 and a comparison/change section 612. The training section 610 reads the training data 500 from the training data storage section 620, and inputs the post-process image data (file name="post-process image data 1", "post-process image data 2", and the like) stored in "input data" to the model 611. Thus, the model 611 outputs the output data. In addition, the training section 610 inputs the etching quality information (file name="etching quality information 1", "etching quality information 2", and the like) stored in the "supervisory data" to the comparison/change section 612.

The comparison/change section 612 updates the model parameter of the model 611 so that the output data output by the model 611 approaches the etching quality information input by the training section 610. Thus, the training section 610 generates a trained model.

<Functional Configuration of Prediction Device>

Figure 7:
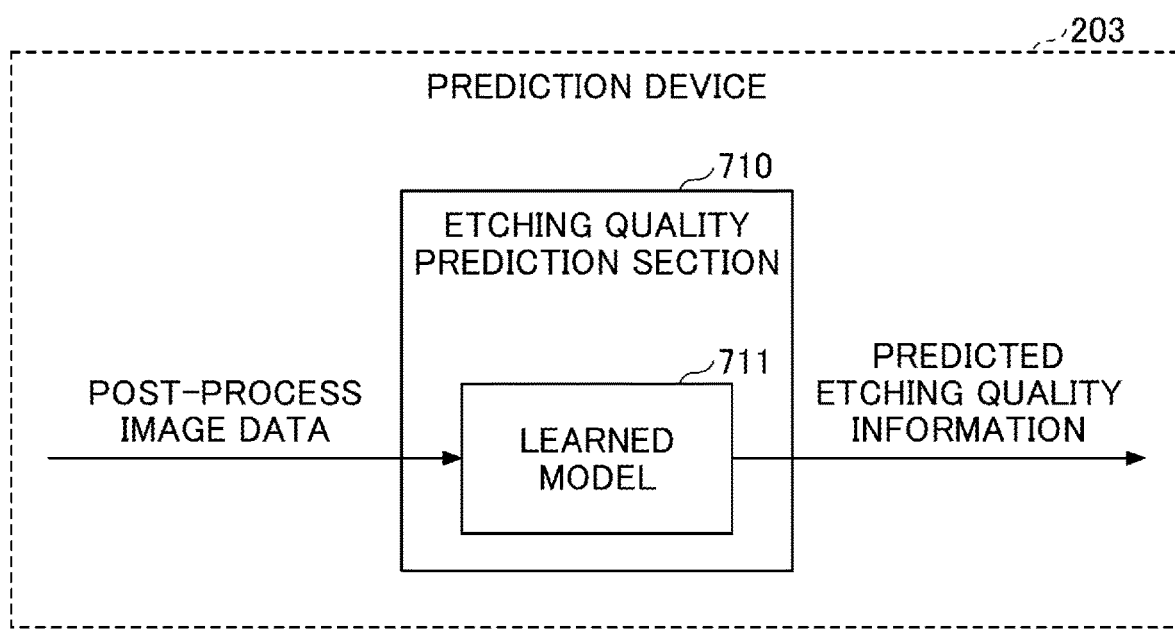
FIG. 7 is a first diagram illustrating an example of a functional configuration of a prediction device.

Next, a functional configuration of the prediction device 203 will be described. FIG. 7 is a first diagram illustrating an example of a functional configuration of the prediction device. An etching quality prediction program is installed in the prediction device 203, and the prediction device 203 functions as the etching quality prediction section 710 (etching quality processor configured to predict) by executing the program.

The etching quality prediction section 710 is an example of a processor configured to predict. The etching quality prediction section 710 includes the trained model 711 generated by the training section 610, predicts the etching quality by inputting the post-process image data of the post-process substrate to the trained model 711, and outputs the predicted etching quality information.

<Specific Example of Predicted Etching Quality Information>

Next, a specific example of the predicted etching quality information output from the prediction device 203 will be described in comparison with the etching quality information output from the external inspection device 110. In the following description, it is assumed that the external inspection device 110 is a film thickness measuring device and the etching quality information and the predicted etching quality information are measured film thickness values or predicted film thickness values.

Figure 8:
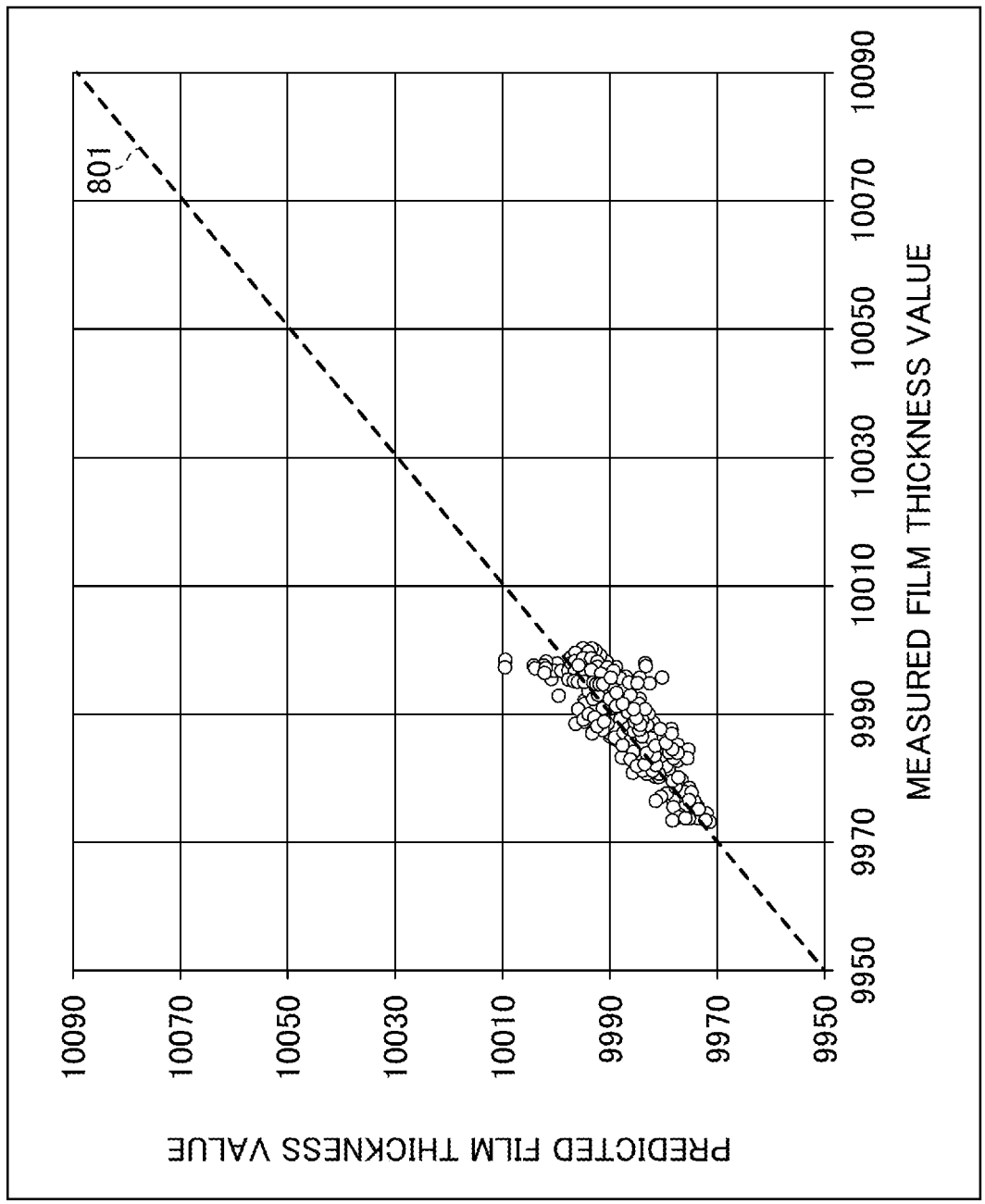
FIG. 8 is a first diagram illustrating a relationship between etching quality information and predicted etching quality information.

FIG. 8 is a first diagram illustrating a relationship between the etching quality information and the predicted etching quality information. In FIG. 8, the horizontal axis represents the measured film thickness value output from the film thickness measuring device, and the vertical axis represents the predicted film thickness value output from the prediction device 203. Each plot represents a set of a measured film thickness value and a predicted film thickness value at a plurality of measurement points of each of a plurality of post-process substrates. Note that the straight line 801 indicates a position plotted when the measured film thickness value and the predicted film thickness value match.

As illustrated in FIG. 8, each plot position is generally along the straight line 801, and a plot greatly deviating from the straight line 801 is not found. Therefore, it can be said that the predicted film thickness value output by the prediction device 203 can substantially reproduce the measured film thickness value. In this way, according to the prediction device 203, it is possible to realize excellent prediction accuracy.

<Flow of Etching Quality Prediction Processing>

Figure 9:
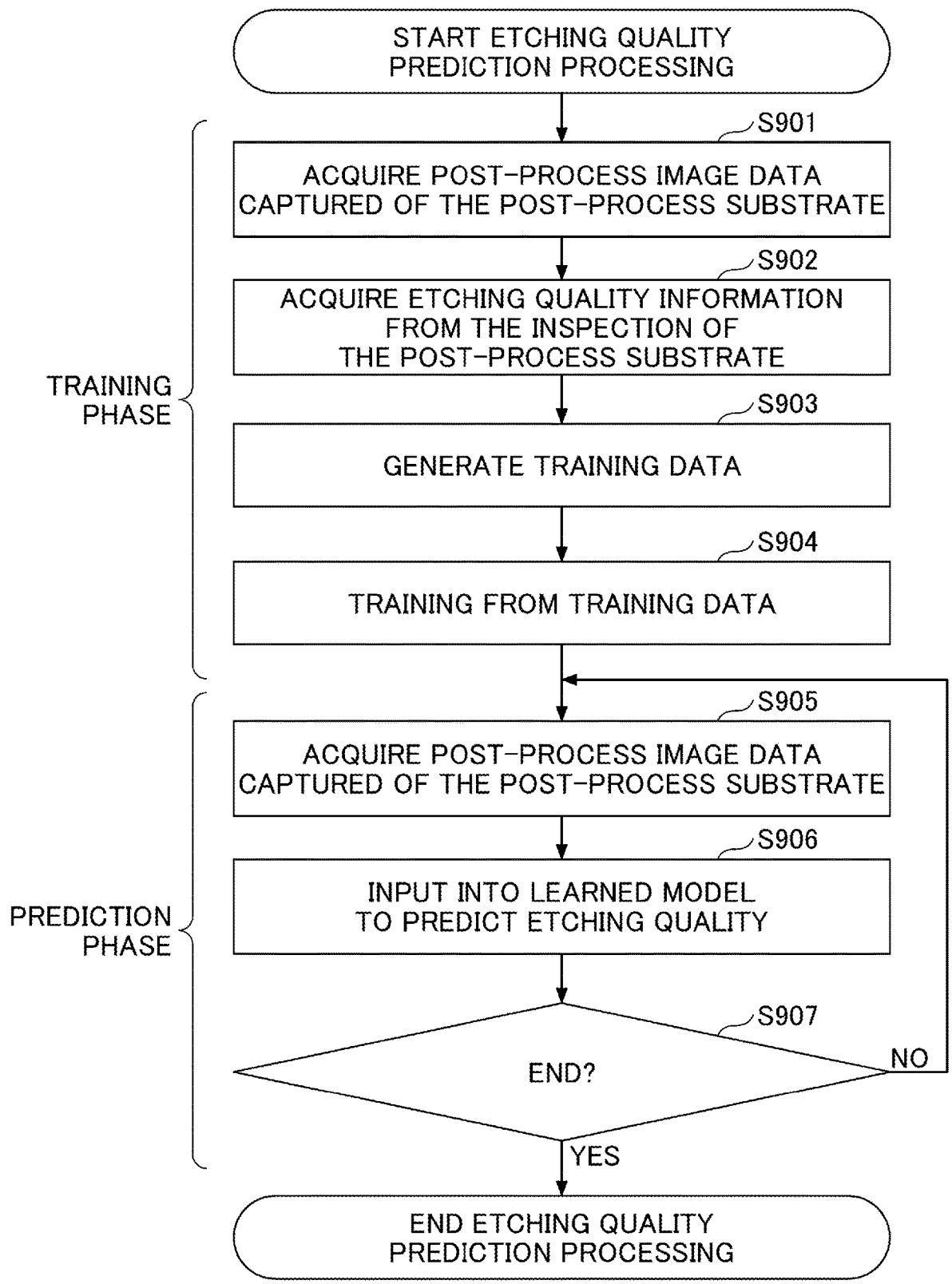
FIG. 9 is a flowchart illustrating a flow of etching quality prediction processing.

Next, a flow of the etching quality prediction processing by the etching processing systems 100 and 200 will be described. FIG. 9 is a flowchart illustrating the flow of the etching quality prediction processing.

First, a process (from Step S901 to Step S904) in the training phase is performed by the etching processing system 100.

In Step S901, the training device 103 acquires a post-process image data generated by capturing an image of the etched post-process substrate.

In Step S902, the training device 103 acquires the etching quality information output by performing the etching quality inspection by the external inspection device 110 on the post-process substrate on which the etching processing is performed.

In Step S903, the training device 103 generates training data using the acquired post-process image data as input data and the acquired etching quality information as supervisory data.

In Step S904, the training device 103 performs training using the generated training data to generate a trained model.

When the processing (Step S901 to Step S904) in the training phase by the etching processing system 100 is completed, subsequently, the processing (Step S905 to Step S907) in the prediction phase by the etching processing system 200 is performed.

In Step S905, the prediction device 203 acquires post-process image data generated by capturing an image of the post-process substrate that has been subjected to etching processing.

In Step S906, the prediction device 203 predicts etching quality by inputting the acquired post-process image date to the trained model, and outputs predicted etching quality information.

In Step S907, the prediction device 203 determines whether or not to end the etching quality prediction processing. When the prediction device 203 determines not to end the etching quality prediction processing in Step S907 (in the case of NO in Step S907), the processing returns to Step S905.

On the other hand, when the prediction device 203 determines to end the etching quality prediction processing in Step S907 (in the case of YES in Step S907), the processing is ended.

Summary

As is apparent from the above description, the etching processing system according to the first embodiment includes the following:
  the post-process image data of the post-process substrate captured by the imaging device disposed on the transfer path of the substrate and the etching quality information of the substrate output by the inspection performed by the external inspection device are acquired;
  a trained model is generated by performing training using training data in which post-process image data of a substrate and etching quality information of the substrate are associated with each other; and
  the etching quality of the substrate is predicted by inputting the post-process image data of the substrate to the trained model, and the predicted etching quality information is output.

As described above, in the etching processing system according to the first embodiment, the imaging device is disposed inside and the trained model is operated by using the post-process image data of the substrate, thereby acquiring the inspection result of the etching quality. As a result, according to the first embodiment, it is possible to significantly reduce the time until the inspection result of the etching quality is obtained as compared with the case where the external inspection device performs the inspection on the post-process substrate transferred from the etching processing system.

Second Embodiment

In the first embodiment, the case where the absolute value indicating the etching result is predicted by using the post-process image data generated by capturing the post-process substrate subjected to the etching processing in the processing module 101 has been described.

On the other hand, the second embodiment describes the case in which the relative value indicating the etching results is predicted as etching quality by using differential image data that includes:
  pre-process image data generated by capturing an image of a pre-process substrate before being subjected to etching processing in the processing module 101; and
  post-process image data generated by capturing an image of the post-process substrate after being subjected to the etching processing in the processing module 101.

The relative value indicating the etching result includes, for example, any one of an etching amount, an etching rate, a ACD value, and the like. The second embodiment will be described below with a focus on differences from the first embodiment.

<System Configuration of Etching Processing System>

First, the system configuration of the etching processing system according to the second embodiment will be described separately for the training phase and the prediction phase.

(1) In Case of Training Phase

Figure 10:
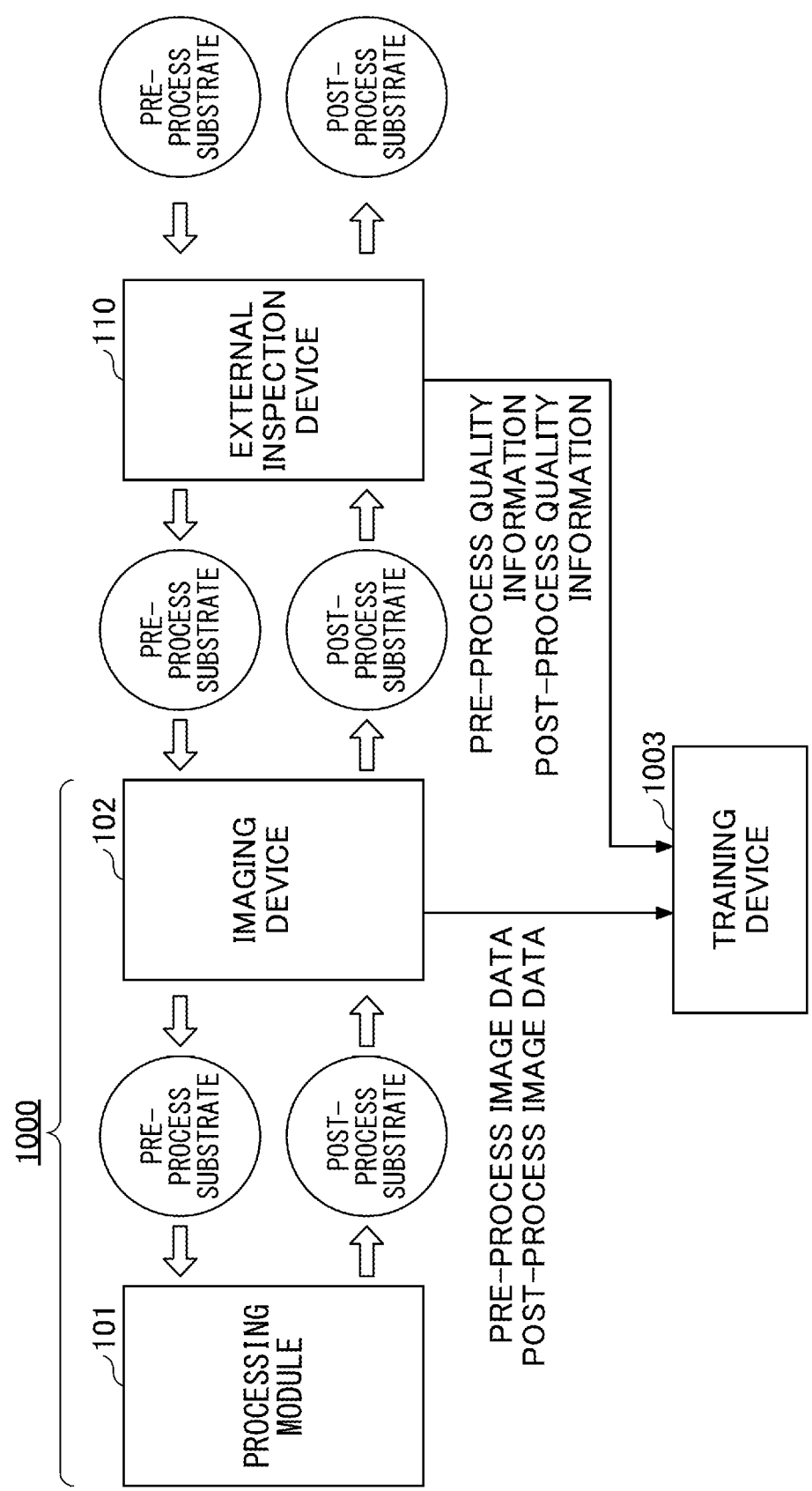
FIG. 10 is a second diagram illustrating an example of the system configuration of the etching processing system in the training phase.

FIG. 10 is a second diagram illustrating an example of the system configuration of the etching processing system in the training phase. As illustrated in FIG. 10, the etching processing system 1000 in the training phase includes a processing module 101, an imaging device 102, and a training device 1003. In the training phase of the present embodiment, the pre-process substrate and the post-process substrate are subjected to inspection of items related to etching quality by the external inspection device 110.

Specifically, in the training phase of the present embodiment, the pre-process substrate and the post-process substrate are post-processed by the following procedure.

First, the pre-process substrate is inspected by the external inspection device 110 for items related to the etching quality (for example, when the etching quality is the "etching amount", the film thickness of the pre-process substrate). Thereafter, the pre-process substrate is transferred on a transfer path in the etching processing system 1000, and an image of the pre-process substrate is captured by the imaging device 102 disposed on the transfer path.

The pre-process quality information (for example, the film thickness value of the pre-process substrate) output by performing the inspection of the item related to the etching quality in the external inspection device 110 is transmitted to the training device 1003. The pre-process image data generated by being captured by the imaging device 102 is transmitted to the training device 1003.

The image of pre-process substrate captured by the imaging device 102 is accommodated in the processing module 101 and is subjected to etching processing in the processing module 101. The post-process substrate generated by the etching processing is transferred on the transfer path, and an image of the post-process substrate is captured by the imaging device 102 disposed on the transfer path. In addition, the post-process substrate captured by the imaging device 102 is transferred out, and an item related to the etching quality (for example, when the etching quality is "etching amount", the film thickness of the post-process substrate) is inspected in the external inspection device 110.

The post-process image data generated by capturing an image of the post-process substrate by the imaging device 102 is transmitted to the training device 1003. Post-process quality information (for example, the film thickness value of the post-process substrate) output when the post-process substrate is inspected in the item related to the etching quality in the external inspection device 110 is transmitted to the training device 1003.

The training device 1003 acquires the pre-process image data and the post-process image data transmitted from the imaging device 102, and acquires the pre-process quality information and the post-process quality information transmitted from the external inspection device 110.

The training device 1003 calculates a difference between the pre-process image data and the post-process image data to generate differential image data. The training device 1003 calculates the etching quality information by calculating the difference between the pre-process quality information and the post-process quality information. The training device 1003 generates training data in which the calculated etching quality information is associated with the differential image data. In addition, the training device 1003 generates a trained model by training a model using the generated training data. Furthermore, the training device 1003 sets the model parameter of the generated trained model in a prediction device to be described later.

(2) In Case of Prediction Phase

Figure 11:
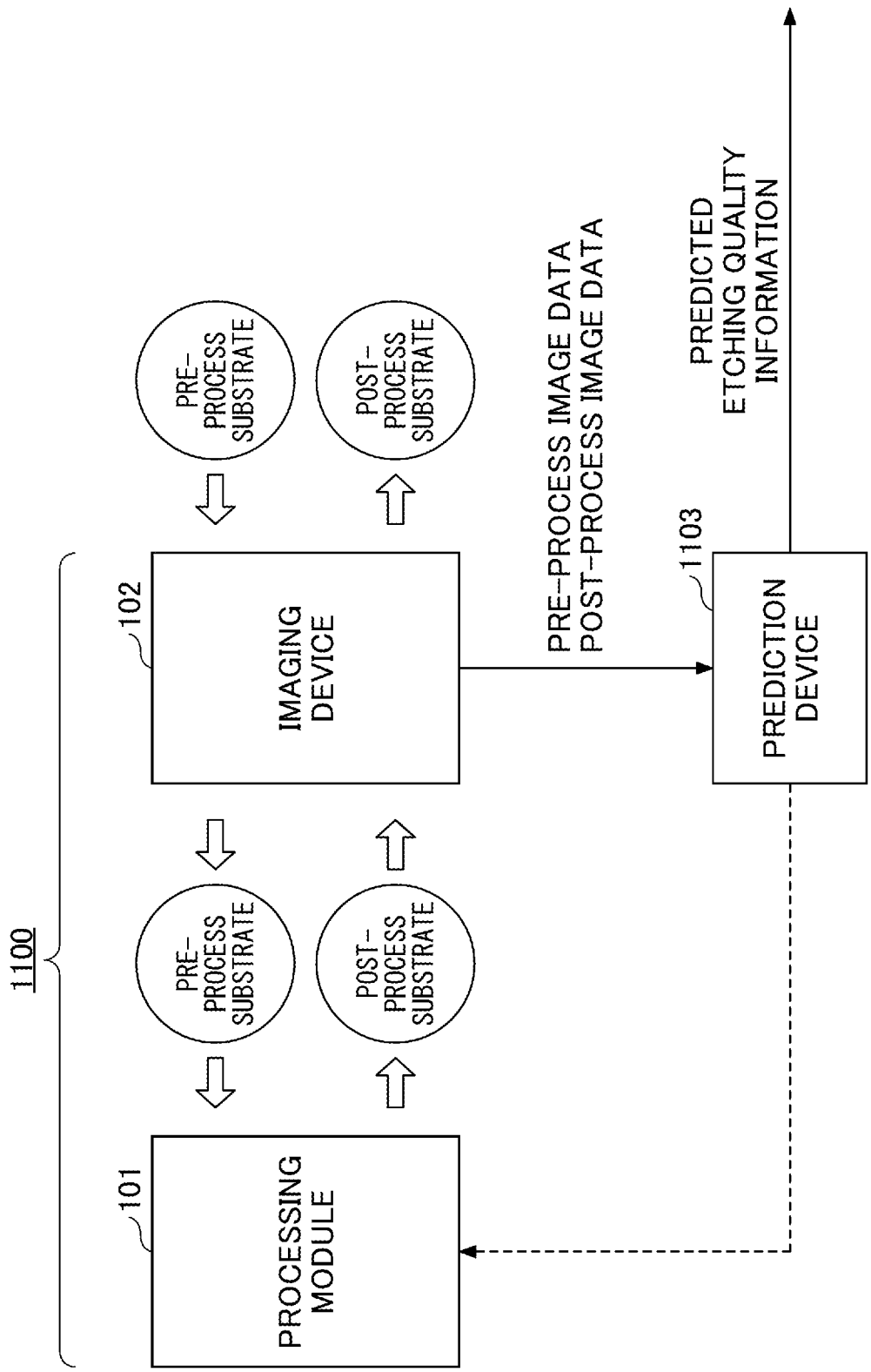
FIG. 11 is a second diagram illustrating an example of the system configuration of the etching processing system in the prediction phase.

FIG. 11 is a second diagram illustrating an example of the system configuration of the etching processing system in the prediction phase. As illustrated in FIG. 11, the etching processing system 1100 in the prediction phase includes a processing module 101, an imaging device 102, and a prediction device 1103.

In the prediction phase of the present embodiment, the pre-process substrate and the post-process substrate are post-processed by the following procedure.

First, the pre-process substrate is transferred on the transfer path in the etching processing system 1100, and an image of the pre-process substrate is captured by the imaging device 102 disposed on the transfer path. The pre-process image data generated by being captured by the imaging device 102 is transmitted to the prediction device 1103.

The image of the pre-process substrate captured by the imaging device 102 is accommodated in the processing module 101 and is subjected to etching processing in the processing module 101. The post-process substrate generated by the etching process is transferred on the transfer path, an image of the post-process substrate is captured by the imaging device 102 disposed on the transfer path, and the post-process substrate is transferred out.

The post-process image data generated by capturing the image of the post-process substrate by the imaging device 102 is transmitted to the prediction device 1103.

The prediction device 1103 calculates a difference between the pre-process image data and the post-process image data transmitted from the imaging device 102, and generates differential image data. Further, the prediction device 1103 predicts the etching quality by inputting the generated differential image data to the trained model, and outputs predicted etching quality information.

As described above, according to the etching processing system 1100, the etching quality can be predicted and the predicted etching quality information can be output every time one pre-process substrate is etched. Thus, as compared with the case where the external inspection device inspects the items related to the etching quality and outputs the pre-process quality information and the post-process quality information, the time until the etching processing system acquires the inspection result of the etching quality can be significantly reduced.

As a result, according to the etching processing system 1100, it is possible to control to feedback the inspection result of the etching quality to the etching processing of the next pre-process substrate in the processing module 101 (see the dotted line).

<Specific Example of Training Data>

Next, a specific example of training data generated by the training device 1003 will be described. FIG. 12 is a second diagram illustrating a specific example of training data. As illustrated in FIG. 12, the training data 1200 includes "acquired image data", "input data", "acquisition quality information", and "supervisory data" as items of information.

The "acquired image data" stores the pre-process image data and the post-process image data generated by capturing the images of the pre-process substrate before being subjected to the etching processing in the processing module 101 and the post-process substrate after being subjected to the etching processing by the imaging device 102. In the example of FIG. 12, file names="pre-process image data 1", "pre-process image data 2", and the like are stored as the pre-process image data, and file names="post-process image data 1", "post-process image data 2", and the like are stored as the post-process image data.

The "input data" stores differential image data generated by calculating a difference between the pre-process image data stored in the "acquired image data" and the corresponding post-process image data. In the example of FIG. 12, file names="differential image data 1", "differential image data 2", and the like are stored as differential image data.

The "acquired quality information" stores the pre-process quality information and the post-process quality information that are output when the pre-process substrate and the post-process substrate are inspected in the items related to the etching quality in the external inspection device 110. In the example of FIG. 12, file names="pre-process quality information 1", "pre-process quality information 2", and the like are stored as the pre-process quality information, and file names="post-process quality information 1", "post-process quality information 2", and the like are stored as the post-process quality information.

In the "supervisory data", etching quality information generated by calculating a difference between the pre-process quality information stored in the "acquired quality information" and the corresponding post-process quality information is stored. In the example of FIG. 12, file names="etching quality information 1", "etching quality information 2", and the like are stored as the etching quality information.

<Functional Configuration of Training Device>

Figure 13:
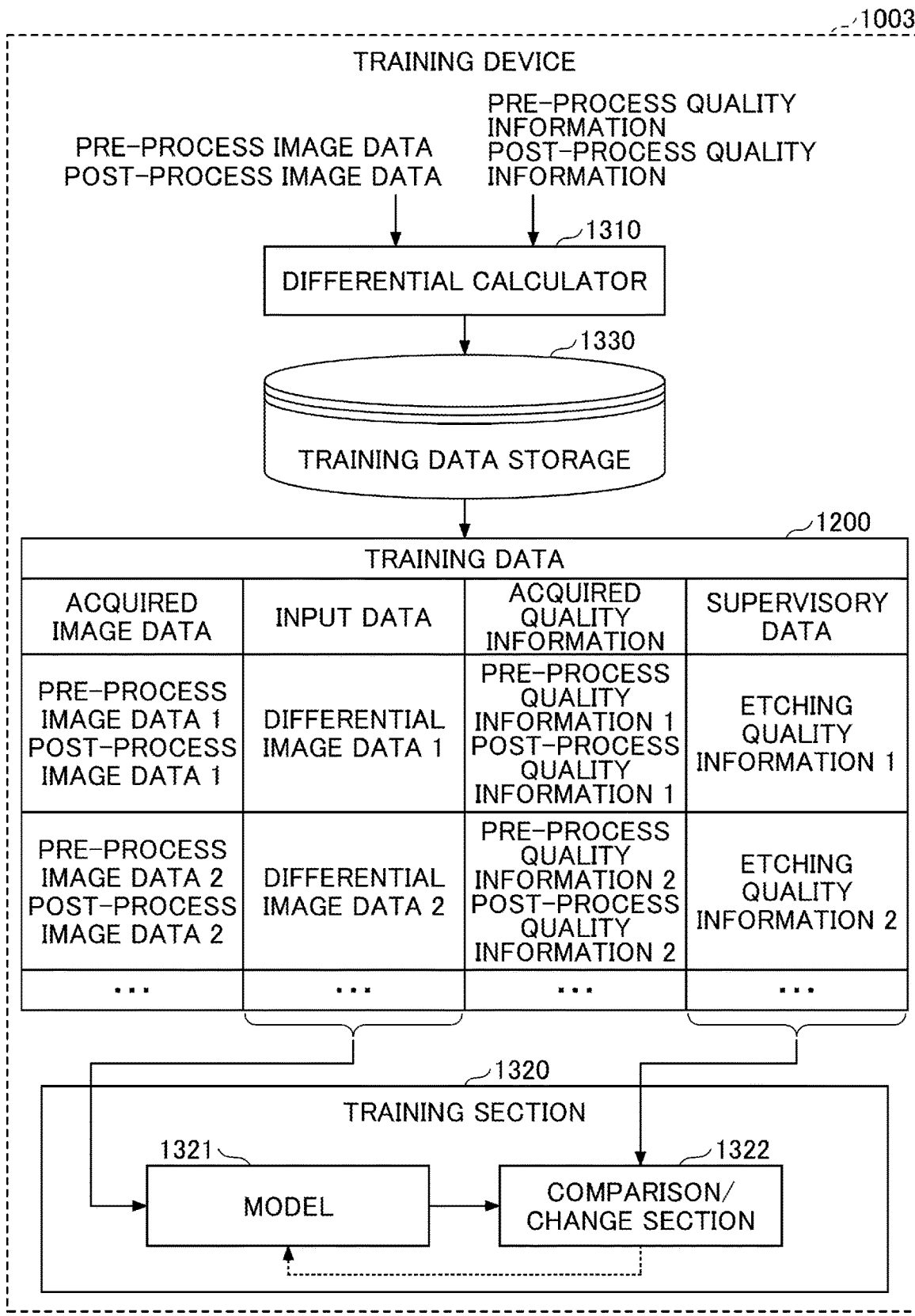
FIG. 13 is a second diagram illustrating an example of a functional configuration of a training device.

Next, a functional configuration of the training device 1003 will be described. FIG. 13 is a second diagram illustrating an example of the functional configuration of the training device. A training program is installed in the training device 1003, and the training device 1003 functions as a differential calculator 1310 and a training section 1320 by executing the program.

The differential calculator 1310 acquires pre-process image data and post-process image data generated by capturing images of the pre-process substrate and the post-process substrate by the imaging device 102, respectively.

The differential calculator 1310 calculates a difference between the acquired pre-process image data and the acquired post-process image data to generate differential image data. Further, the differential calculator 1310 stores the generated differential image data in the "input data" and the "acquired image data" of the training data 1200 in the training data storage section 1330 in association with the pre-process image data and the post-process image data, respectively.

In addition, the differential calculator 1310 acquires the pre-process quality information and the post-process quality information output when the external inspection device 110 inspects the items related to the etching quality of the pre-process substrate and the post-process substrate, respectively.

The differential calculator 1310 calculates a difference between the acquired pre-process quality information and the acquired post-process quality information to generate etching quality information. Further, the differential calculator 1310 associates the generated etching quality information with the pre-process quality information and the post-process quality information, for storage in "supervisory data" and "acquired quality information" of the training data 1200 in the training data storage section 1330, respectively.

The training section 1320 includes a model 1321 and a comparison/change section 1322. The training section 1320 reads the training data 1200 from the training data storage section 1330, and inputs the differential image data (file name: "differential image data 1", "differential image data 2", and the like) stored in "input data" to the model 1321.

Thus, the model 1321 outputs the output data. In addition, the training section 1320 inputs the etching quality information (file name: "etching quality information 1", "etching quality information 2", and the like) stored in the "supervisory data" to the comparison/change section 1322.

The comparison/change section 1322 updates the model parameter of the model 1321 so that the output data output by the model 1321 approaches the etching quality information input by the training section 1320. Thus, the training section 1320 generates a trained model.

<Relationship Between Differential Image Data and Etching Quality Information>

Next, the relationship between the differential image data generated by the differential calculator 1310 and the etching quality information will be described. Here, as an example, a relationship between the differential image data and the etching amount will be described.

Figure 14:
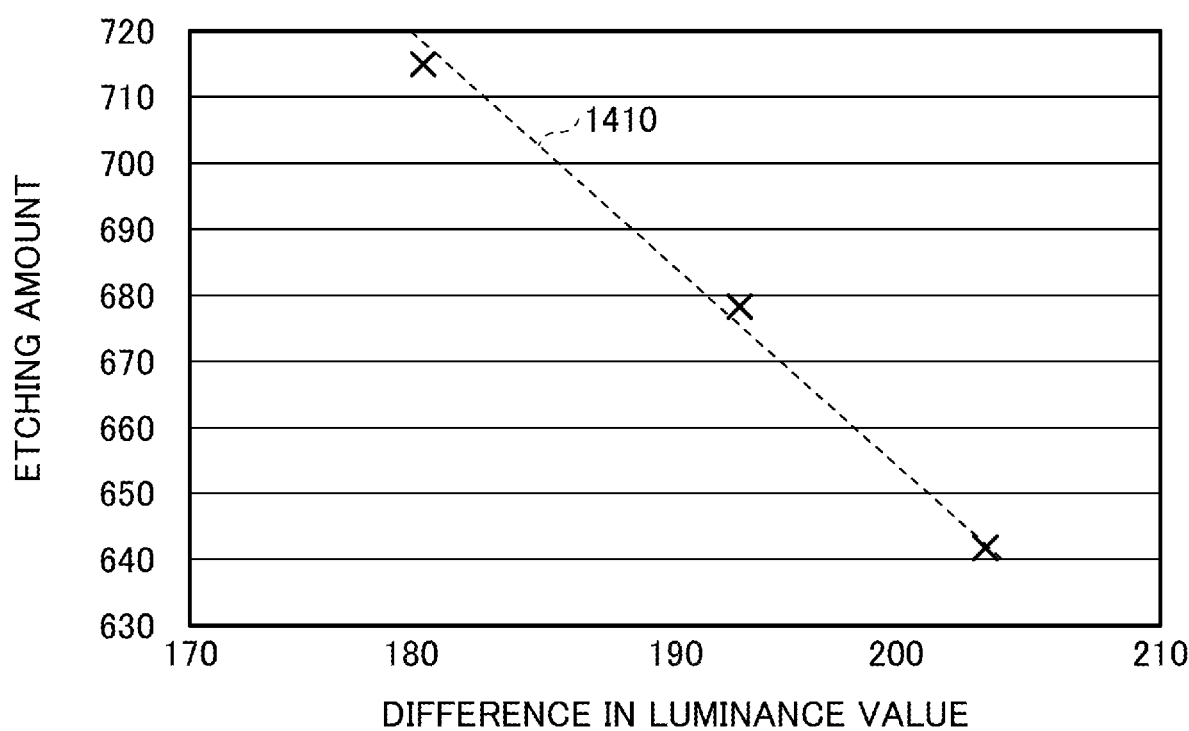
FIG. 14 is a diagram illustrating a relationship between the differential image data and the etching amount.

FIG. 14 is a diagram illustrating a relationship between the differential image data and the etching amount. In FIG. 14, the horizontal axis represents the luminance value of the differential image data (the difference in luminance value between the pre-process image data and the post-process image data), the vertical axis represents the etching amount, and each plot is performed by the following procedure:

film thicknesses at a plurality of measurement points are measured for a pre-process substrate, and film thickness value information including a plurality of film thickness values is generated and output;

an image of the pre-process substrate is captured, and the luminance values at the plurality of measurement points are extracted from the pre-process image data;

the pre-process substrate is etched to produce a post-process substrate;

an image of the post-process substrate is captured, and luminance values at the plurality of measurement points are extracted from the post-process image data;

the film thicknesses of the post-process substrate at the plurality of measurement points are measured, and film thickness value information including a plurality of film thickness values is generated and output; and at each of the plurality of measurement points, a pair of a difference in luminance value and a difference in film thickness value (that is, an etching amount) is generated and plotted on a graph.

In FIG. 14, reference numeral 1410 denotes an approximate straight line calculated based on a set of a difference in luminance value and an etching amount. As illustrated in FIG. 14, there is a certain degree of correlation between the differential image data and the etching amount.

<Functional Configuration of Prediction Device>

Figure 15:
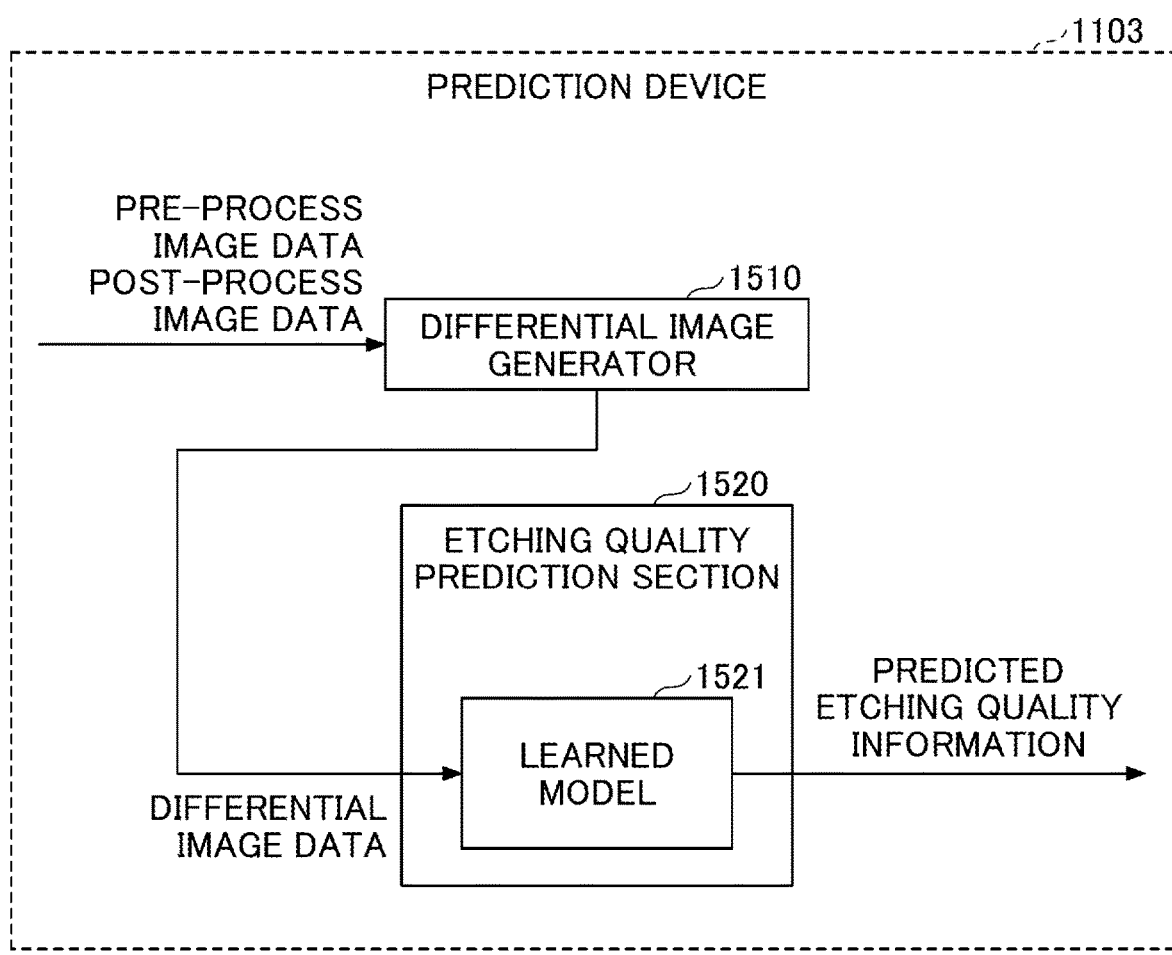
FIG. 15 is a second diagram illustrating an example of a functional configuration of a prediction device.

Next, a functional configuration of the prediction device 1103 will be described. FIG. 15 is a second diagram illustrating an example of a functional configuration of the prediction device. An etching quality prediction program is installed in the prediction device 1103, and the prediction device 1103 functions as a differential image generator 1510 and an etching quality prediction section 1520 (an etching quality processor configured to predict) by executing the program.

The differential image generator 1510 acquires the pre-process image data and the post-process image data of the pre-process substrate and the post-process substrate. The differential image generator 1510 calculates a difference between the pre-process image data and the post-process image data to generate differential image data.

The etching quality prediction section 1520 is another example of the processor configured to predict, and includes a trained model 1521 generated by the training section 1320. The etching quality prediction section 1520 predicts etching quality by inputting the differential image data generated by the differential image generator 1510 to the trained model 1521, and outputs predicted etching quality information.

<Specific Example of Predicted Etching Quality Information>

Figure 16:
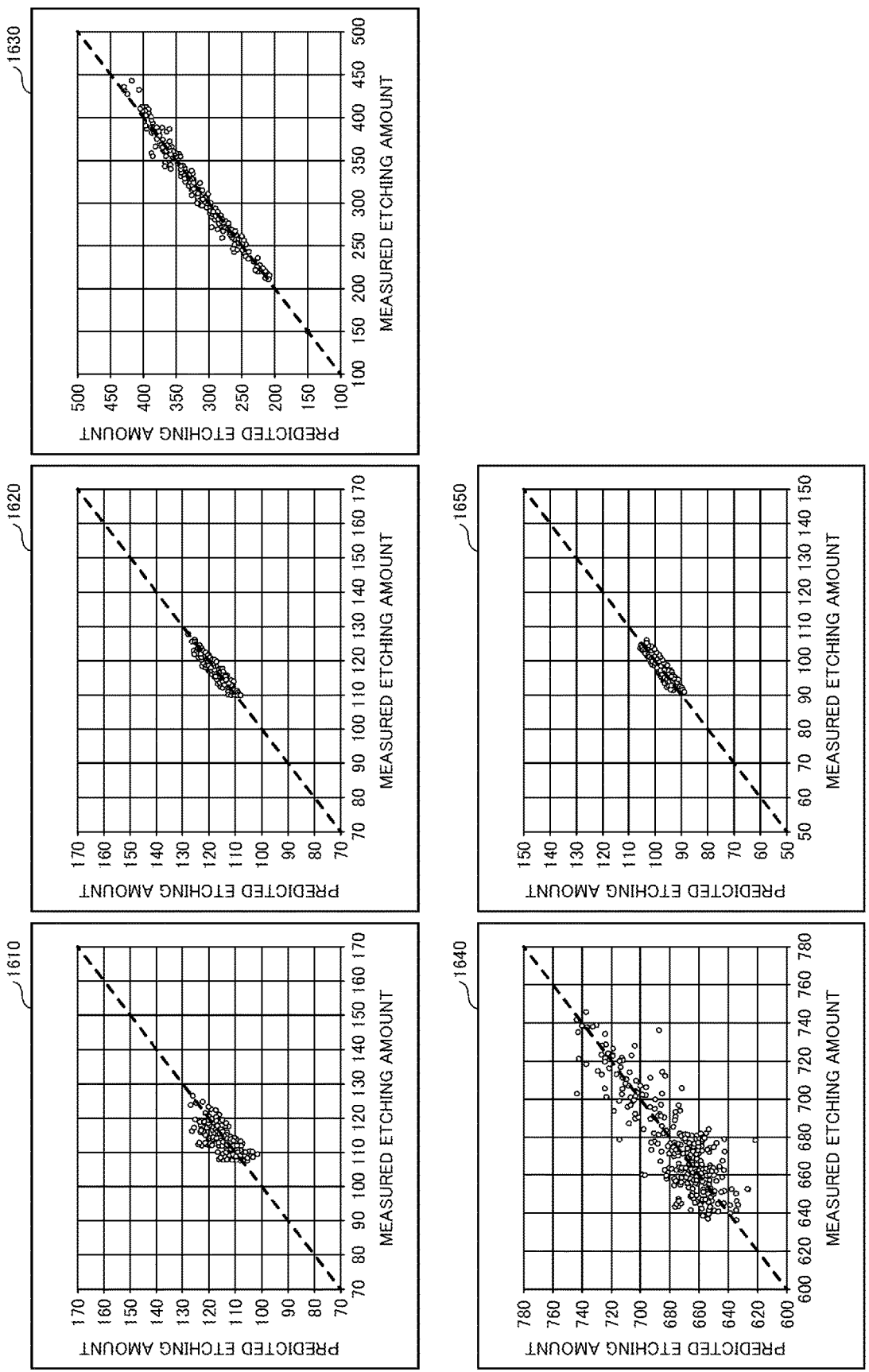
FIG. 16 is a second diagram illustrating the relationship between etching quality information and predicted etching quality information.

Next, a specific example of the predicted etching quality information output from the prediction device 1103 will be described in comparison with the etching quality information generated by calculating the difference between the pre-process quality information and the post-process quality information output from the external inspection device 110. FIG. 16 is a second diagram illustrating the relationship between etching quality information and predicted etching quality information. Specifically, in the example of FIG. 16, in a case where etching processing is performed on pre-process substrates having different initial film thicknesses and film types, the following is compared:

an etching amount output from the prediction device 1103 (vertical axis: predicted etching amount); and an etching amount (horizontal axis: measured etching amount) generated by calculating a difference between the film thickness value of the pre-process substrate and the film thickness value of the post-process substrate output from the external inspection device 110.

In FIG. 16, reference numeral 1610 indicates the relationship between the predicted etching amount and the measured etching amount in the case where a pre-process substrate having an initial film thickness of 1.0 µm and a film type of a silicon oxide film (Ox) is subjected to etching processing.

Furthermore, reference numeral 1620 indicates the relationship between the predicted etching amount and the measured etching amount in the case where a pre-process substrate having an initial film thickness of 0.1 µm and a film type of a silicon oxide film (Ox) is subjected to etching processing.

In addition, reference numeral 1630 indicates the relationship between the predicted etching amount and the measured etching amount in the case where a pre-process substrate having an initial film thickness of 1.0 µm and a film type of a silicon oxide film (Ox) is subjected to etching processing.

Moreover, reference numeral 1640 indicates the relationship between the predicted etching amount and the measured etching amount in the case where a pre-process substrate having an initial film thickness of 1.5 µm and a film type of photoresist (PR) is subjected to etching processing.

Furthermore, reference numeral 1650 indicates the relationship between the predicted etching amount and the measured etching amount in the case where a pre-process substrate having an initial film thickness of 0.25 µm and a film type of a silicon nitride film (SiN) is subjected to etching processing.

As illustrated in the example of FIG. 16, in the case of the prediction device 1103, the hard film (Ox, SiN) can realize higher prediction accuracy than an organic film. In addition, in the case of the prediction device 1103, higher prediction accuracy can be realized when the initial film thickness is smaller.

Summary

As is apparent from the above description, the etching processing system according to the second embodiment includes the following:

the pre-process image data of the pre-process substrate and the post-process image data of the post-process substrate captured by the imaging device disposed on the transfer path of the substrate, and the pre-process quality information of the pre-process substrate and the post-process quality information of the post-process substrate output by the inspection performed by the external inspection device are acquired;

a trained model is generated by performing training using training data in which differential image data obtained by subtracting the pre-process image data and the post-process image data is associated with etching quality information obtained by subtracting the pre-process quality information and the post-process quality information; and differential image data obtained by subtracting the pre-process image data of the pre-process substrate from the post-process image data of the post-process substrate is input to the trained model to output predicted etching quality information of the pre-process substrate and the post-process substrate.

As described above, in the etching processing system according to the second embodiment, the imaging device is disposed inside, and the trained model is operated by using the pre-process image data of the pre-process substrate and the post-process image data of the post-process substrate to acquire the inspection result of the etching quality. As a result, according to the second embodiment, it is possible to significantly reduce the time until the inspection result of the etching quality is obtained, as compared with the case where the external inspection device performs the inspection on the pre-process substrate transferred into the etching processing system and the post-process substrate transferred out from the etching processing system.

Third Embodiment

In the second embodiment, when the etching quality is predicted, the processor configured to predict inputs the differential image data obtained by subtracting the pre-process image data and the post-process image data to the trained model and directly predicts the etching quality.

On the other hand, in the third embodiment, two trained models are provided, one trained model predicts the pre-process quality from the pre-process image data, and the other trained model predicts the post-process quality from the post-process image data. Then, the etching quality is predicted based on the predicted pre-process quality and post-process quality. Hereinafter, the third embodiment will be described focusing on differences from the first and second embodiments.

<Specific Example of Training Data>

First, a specific example of the training data generated in the third embodiment will be described. FIG. 17 is a third diagram illustrating a specific example of training data. As illustrated in FIG. 17, the training data 1710 includes "input data" and "supervisory data" as information items.

The "input data" stores pre-process image data generated by capturing an image of a pre-process substrate before undergoing etching in the processing module 101 by the imaging device 102. In the example of FIG. 17, file names="pre-process image data 1", "pre-process image data 2", and the like are stored as the pre-process image data.

In the "supervisory data", the pre-process quality information output by performing the inspection of the item related to the etching quality on the pre-process substrate in the external inspection device 110 is stored. In the example of FIG. 17, file names="pre-process quality information 1", "pre-process quality information 2", and the like are stored as the pre-process quality information.

Similarly, the training data 1720 includes "input data" and "supervisory data" as information items.

The "input data" stores post-process image data generated by capturing an image of the post-process substrate subjected to the etching processing in the processing module 101 by the imaging device 102. In the example of FIG. 17, file names="post-process image data 1", "post-process image data 2", and the like are stored as the post-process image data.

In the "supervisory data", the post-process quality information output by performing the inspection of the item related to the etching quality on the post-process substrate in the external inspection device 110 is stored. In the example of FIG. 17, file names="post-process quality information 1", "post-process quality information 2", and the like are stored as the post-process quality information.

<Functional Configuration of Training Device>

Figure 18:
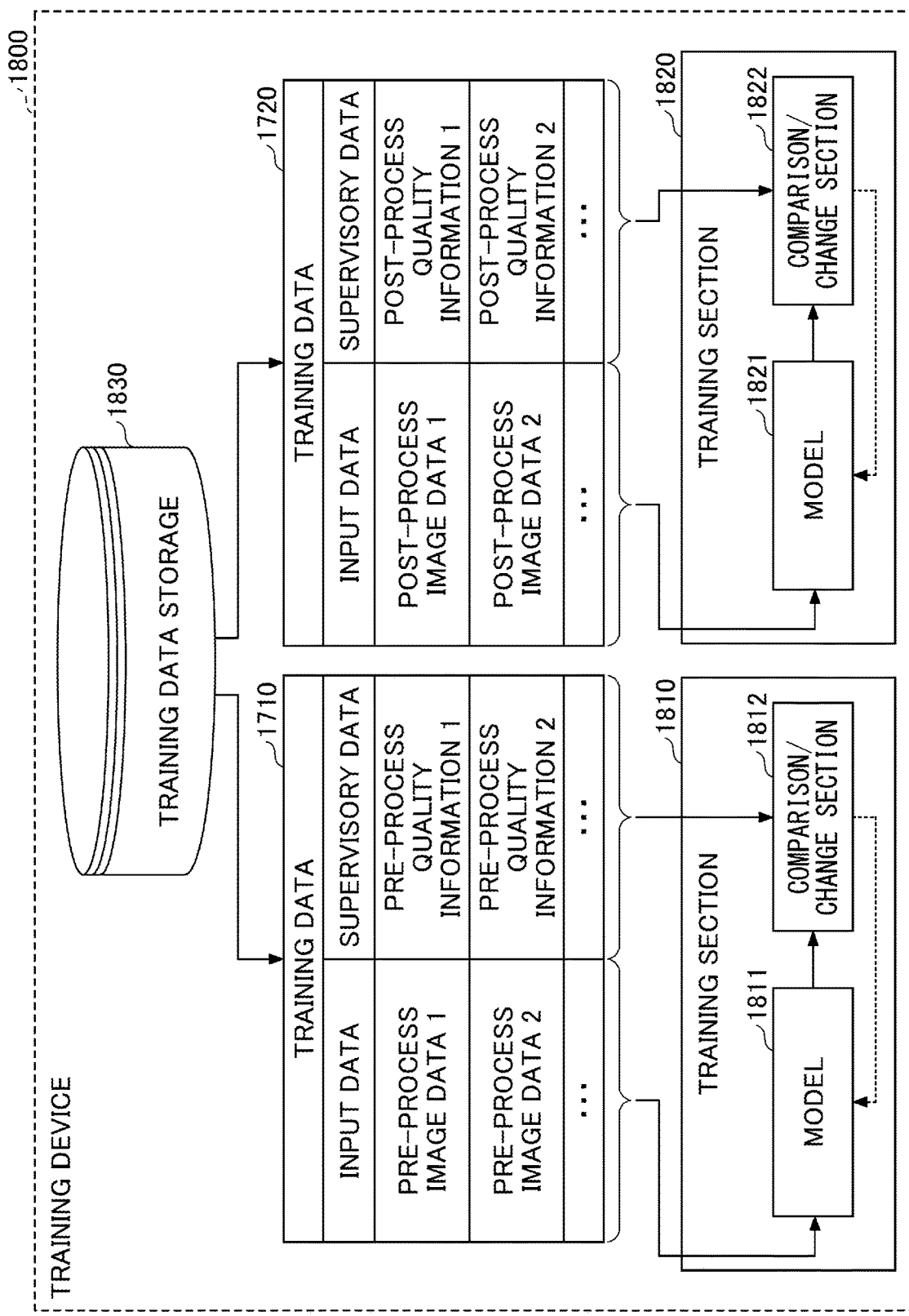
FIG. 18 is a third diagram illustrating an example of a functional configuration of a training device.

Next, a functional configuration of the training device will be described. FIG. 18 is a third diagram illustrating an example of a functional configuration of the training device. A training program is installed in the training device 1800, and the training device 1800 functions as a training section 1810 and a training section 1820 by executing the program.

The training section 1810 includes a model 1811 and a comparison/change section 1812. The training section 1810 reads the training data 1710 from the training data storage section 1830, and inputs the pre-process image data (file name: "pre-process image data 1", "pre-process image data 2", and the like) stored in the "input data" to the model 1811. Thus, the model 1811 outputs the output data. In addition, the training section 1810 inputs the pre-process quality information (file name: "pre-process quality information 1", "pre-process quality information 2", and the like) stored in the "supervisory data" to the comparison/change section 1812.

The comparison/change section 1812 updates the model parameters of the model 1811 so that the output data output by the model 1811 approaches the pre-process quality information input by the training section 1810. Thus, the training section 1810 generates a trained model.

Similarly, the training section 1820 includes a model 1821 and a comparison/change section 1822. The training section 1820 reads the training data 1720 from the training data storage section 1830, and inputs the post-process image data (file name: "post-process image data 1", "post-process image data 2", and the like) stored in "input data" to the model 1821. Thus, the model 1821 outputs the output data. In addition, the training section 1820 inputs the post-process quality information (file name: "post-process quality information 1", "post-process quality information 2", and the like) stored in the "supervisory data" to the comparison/change section 1822.

The comparison/change section 1822 updates the model parameter of the model 1821 so that the output data output by the model 1821 approaches the post-process quality information input by the training section 1820. Thus, the training section 1820 generates a trained model.

<Functional Configuration of Prediction Device>

Figure 19:
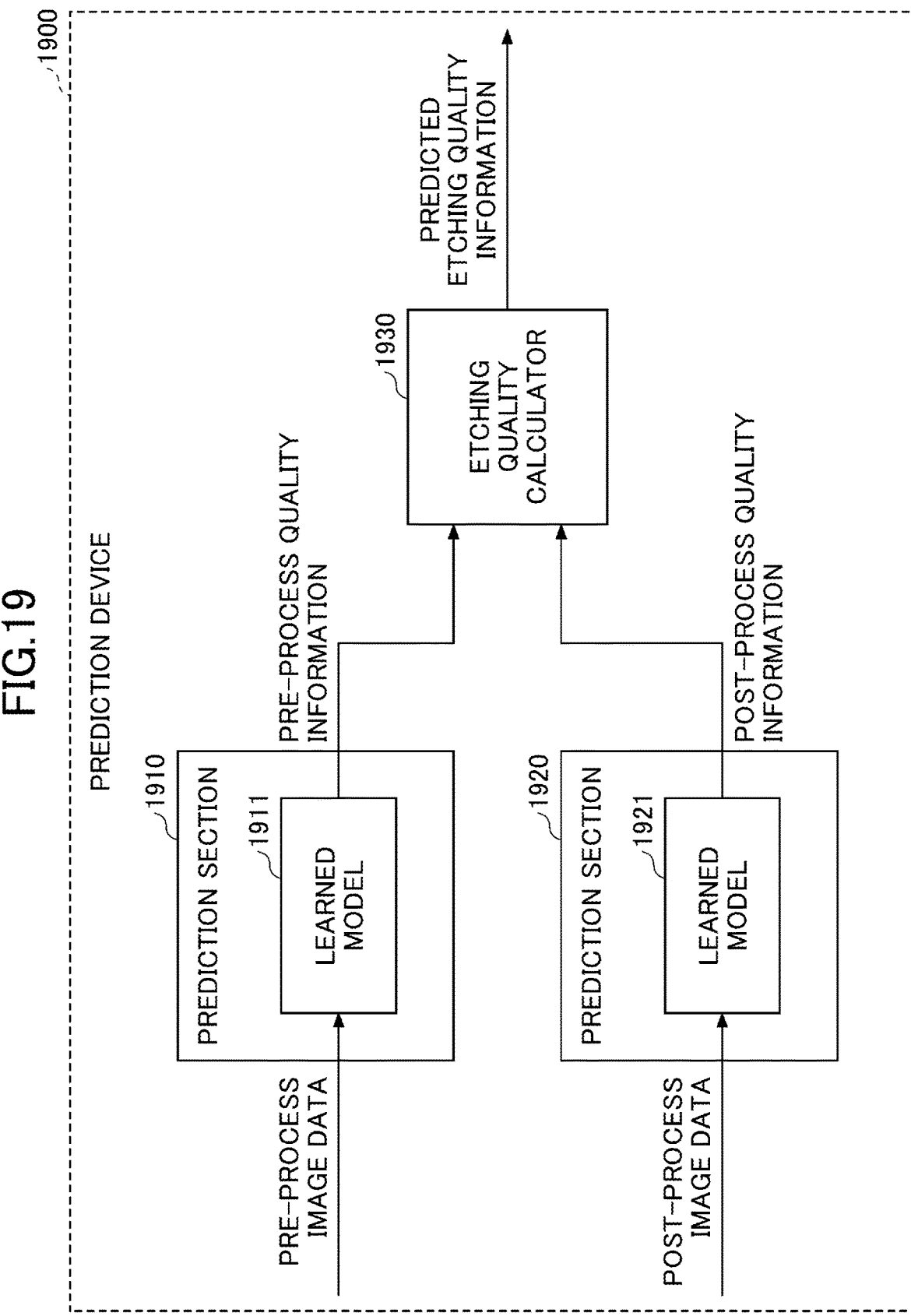
FIG. 19 is a third diagram illustrating an example of a functional configuration of a prediction device.

Next, a functional configuration of the prediction device according to the third embodiment will be described. FIG. 19 is a third diagram illustrating an example of a functional configuration of the prediction device. An etching quality prediction program is installed in the prediction device 1900, and the prediction device 1900 functions as a processor configured to predict (prediction section) 1910, a processor configured to predict (prediction section) 1920, and an etching quality calculator 1930 by executing the program.

The processor configured to predict (prediction section) 1910 includes the trained model 1911 generated by the training section 1810, predicts the pre-process quality by inputting the pre-process image data generated by capturing an image of the pre-process substrate to the trained model 1911, and outputs the pre-process quality information.

The processor configured to predict (prediction section) 1920 includes the trained model 1921 generated by the training section 1820, predicts the post-process quality by inputting the post-process image data generated by capturing an image of the post-process substrate to the trained model 1921, and outputs the post-process quality information.

The etching quality calculator 1930 calculates a difference between the pre-process quality information output from the processor configured to predict (prediction section) 1910 and the post-process quality information output from the processor configured to predict (prediction section) 1920 to predict etching quality, and outputs predicted etching quality information.

<Specific Example of Predicted Etching Quality Information>

Figure 20:
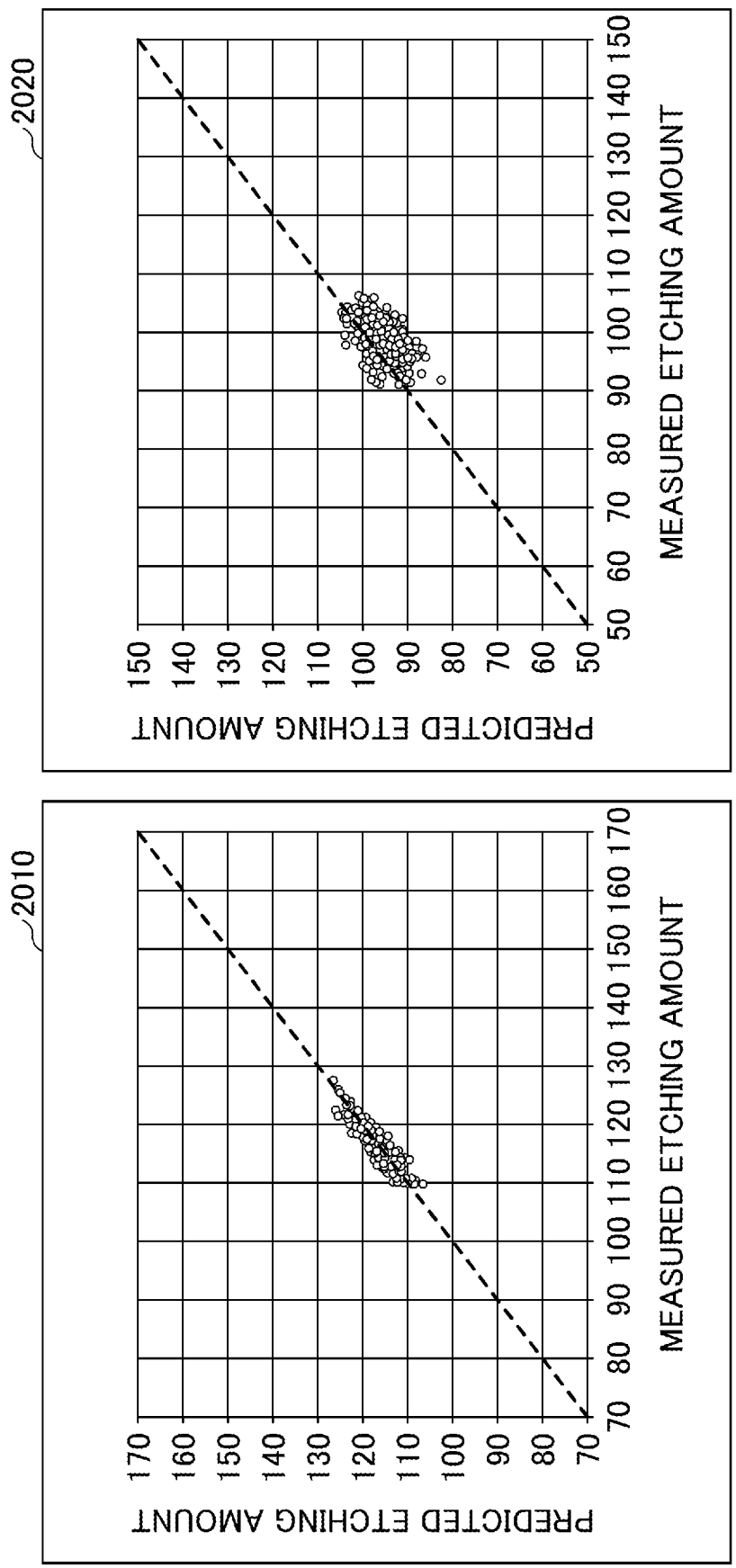
FIG. 20 is a third diagram illustrating the relationship between etching quality information and predicted etching quality information.

Next, a specific example of the predicted etching quality information output from the prediction device 1900 will be described in comparison with the etching quality information generated by calculating the difference between the pre-process quality information and the post-process quality information output from the external inspection device 110. FIG. 20 is a third diagram illustrating the relationship between etching quality information and predicted etching quality information. Specifically, in the example of FIG. 20, in a case where respective pre-process substrates having different initial film thicknesses and film types are subjected to etching processing, the following is compared:

an etching amount output from the prediction device 1900 (vertical axis: predicted etching amount); and an etching amount (horizontal axis: measured etching amount) generated by calculating a difference between the film thickness value of the pre-process substrate and the film thickness value of the post-process substrate output from the external inspection device 110.

In FIG. 20, reference numeral 2010 indicates the relationship between the predicted etching amount and the measured etching amount in the case where a pre-process substrate having an initial film thickness of 0.1 μm and a film type of a silicon oxide film (Ox) is subjected to etching processing.

Furthermore, reference numeral 2020 indicates the relationship between the predicted etching amount and the measured etching amount in the case where a pre-process substrate having an initial film thickness of 0.25 μm and a film type of a silicon nitride film (SiN) is subjected to etching processing.

As illustrated in the example of FIG. 20, in the case of the prediction device 1900, the silicon oxide film (Ox) can realize higher prediction accuracy than the silicon nitride film (SiN) even when the hard films are the same.

Summary

As is apparent from the above description, the etching processing system according to the third embodiment includes the following:

the pre-process image data of the pre-process substrate and the post-process image data of the post-process substrate captured by the imaging device arranged on the transfer path of the substrates, and the pre-process quality information of the pre-process substrate and the post-process quality information of the post-process substrate output by the inspection performed by the external inspection device are acquired;

a first trained model is generated by performing training using training data in which pre-process image data and pre-process quality information are associated with each other;

a second trained model is generated by performing training using training data in which post-process image data and post-process quality information are associated with each other;

the pre-process image data of the pre-process substrate is input to the first trained model to output the pre-process quality information of the pre-process substrate. In addition, the post-process image data of the post-process substrate is input to the second trained model to output the post-process quality information of the post-process substrate; and a difference between the pre-process quality information and the post-process quality information is calculated, and predicted etching quality information of the pre-process substrate and the post-process substrate is output.

As described above, in the etching processing system according to the third embodiment, the imaging device is disposed inside, and each trained model is operated using the pre-process image data of the pre-process substrate and the post-process image data of the post-process substrate, thereby acquiring the inspection result of the etching quality. As a result, according to the third embodiment, it is possible to significantly reduce the time until the inspection result of the etching quality is obtained as compared with the case where the external inspection device performs the inspection on the pre-process substrate transferred into the etching processing system and the post-process substrate transferred out from the etching processing system.

Fourth Embodiment

In the first to third embodiments, the prediction device has the function of outputting the predicted etching quality information, but the function of the prediction device is not limited thereto. For example, a controller that feeds back the predicted etching quality and controls the processing content of the substrate to be etched after the substrate (for example, corrects the control amount of a control knob) may be included.

In this case, for example, a trained process control model generated by training the relationship between the control amount of the control knob and the etching quality in advance is arranged in the controller, and the controller operates the control knob by the control amount derived using the model. Specifically, when the predicted etching quality information deviates from the target value, the controller derives a control amount by using the model so as to correct the deviation amount, and operates the control knob by the derived control amount.

As described above, by using the predicted etching quality information to control the processing content of the etching processing, the etching processing system 200 can realize the etching quality in accordance with the target value.

Fifth Embodiment

In the first to fourth embodiments, the training section performs training in the training phase and generates a trained model. However, the function of the training section is not limited to this. For example, in the prediction phase, when a predetermined condition is satisfied, a function of performing retraining on the generated trained model may be included.

The case where the predetermined condition is satisfied refers to, for example, a case where training data is generated by continuously performing the inspection of the etching quality by the external inspection device 110 even in the prediction phase and a predetermined amount of training data is accumulated. Alternatively, by continuously performing the inspection of the etching quality by the external inspection device 110 even in the prediction phase, the difference between the etching quality information and the predicted etching quality information is monitored, and the difference between the etching quality information and the predicted etching quality information becomes equal to or greater than a predetermined threshold value.

A method of retraining by the training section is arbitrary. For example, a trained model may be newly generated by performing training from the start using training data accumulated in the prediction phase. Alternatively, the trained model may be updated by performing additional training on the trained model operating in the prediction phase using the training data accumulated in the prediction phase.

As described above, since the training section has the function of performing the retraining, the etching processing system 100 can improve the prediction accuracy after the etching quality prediction processing has transitioned to the prediction phase.

Other Embodiments

In each of the above-described embodiments, the case where the training device and the prediction device are configured as separate devices has been described, but the training device and the prediction device may be configured as an integrated device.

In each of the above-described embodiments, the training device and the prediction device are integrally configured with the plurality of modules constituting the etching processing system 100 or 200. However, the training device and the prediction device may be configured separately from the plurality of modules constituting the etching processing system 100 or 200, for example, to be connected via a network.

Although the imaging device 102 is disposed in the orienter ORT included in the etching processing system 100 or 200 in each of the above-described embodiments, the imaging device 102 is not limited to be disposed in the orienter ORT. As long as images of both the pre-process substrate and the post-process substrate can be captured by the imaging device, the imaging devices can be arranged at arbitrary positions on the transfer path. In addition, the number of imaging devices to be installed is not limited to one, and a plurality of imaging devices may be installed.

Further, in each of the above-described embodiments, the film thickness value or the etching amount which is the difference between the film thickness values is used as the etching quality information or the predicted etching quality information. However, the etch quality information or the predicted etch quality information is not limited thereto.

Although the method of calculating the differential image data is not described in the second embodiment, the differential image data may be calculated for each color component, and the differential image data of a specific color component having a higher correlation with the item related to the etching quality may be selected. Alternatively, the differential image data may be calculated by using the pre-process image data and the post-process image data of a specific color component. Alternatively, instead of selecting the differential image data of a specific color component, the differential image data may be post-processed so that the correlation with the item related to the etching quality becomes higher.

In the disclosed technique, the following embodiments can be considered.

APPENDIX 1

An etching processing system includes a memory; and a processor coupled to the memory and configured to predict etching quality of a substrate by inputting image data of the substrate into a trained model trained by using training data in which image data of substrates captured by an imaging device arranged on a transfer path of the substrates and information for predicting etching quality of the substrates are associated with each other.

APPENDIX 2

The etching processing system according to Appendix 1, wherein the trained model is trained by using the training data in which the image data of the substrates obtained by imaging the substrates after undergoing etching is used as input data, and etching quality information obtained by inspecting etching quality of the substrates after undergoing etching is used as supervisory data.

APPENDIX 3

The etching processing system according to Appendix 1 or 2, wherein the trained model is trained by using the training data in which differential image data obtained as differences between pre-process image data obtained by imaging the substrates before undergoing etching and post-process image data obtained by imaging the substrates after undergoing etching is used as input data, and etching quality information obtained as differences between pre-process quality information obtained by inspecting the substrates before undergoing etching with respect to items related to etching quality of the substrates and post-process quality information obtained by inspecting the substrates after undergoing etching with respect to items related to etching quality of the substrates is used as supervisory data.

APPENDIX 4

The etching processing system according to any one of Appendices 1 to 3, wherein the trained model includes: a first trained model in which training is performed using training data in which pre-process image data generated by capturing the image of the substrate before undergoing etching is input data and pre-process quality information output by performing inspection of an item related to etching quality of the substrate before undergoing etching is supervisory data; and a second trained model in which training is performed using training data in which the post-process image data generated by capturing the image of the substrate after undergoing etching is input data and post-process quality information output by performing inspection of an item related to etching quality of the substrate after undergoing etching is supervisory data; wherein the processor is configured to predict etching quality of the substrate based on the pre-process quality information output by inputting the pre-process image data generated by capturing the image of the substrate before undergoing etching to the first trained model and the post-process quality information output by inputting the post-process image data generated by capturing the image of the substrate after undergoing etching to the second trained model.

APPENDIX 5

The etching processing system according to any one of Appendices 2 to 4, wherein the processor is further configured to predict, as the etching quality, at least one of a film thickness value, a CD value, and a value related to a cross-sectional shape of the substrate that has been subjected to the etching.

APPENDIX 6

The etching processing system according to Appendix 3 or 4, wherein the items related to the etching quality includes at least one of a film thickness value, a CD value, and a value related to a cross-sectional shape, and wherein the processor is configured to predict, as the etching quality, at least one of an etching amount, an etching rate, and a ACD value of the substrate that has been subjected to the etching.

APPENDIX 7

The etching processing system according to Appendix 6, wherein the pre-process image data and the post-process image data are image data of a specific color component.

APPENDIX 8

The etching processing system according to any one of Appendices 1 to 7, further comprising a controller configured to control, based on the predicted etching quality of the substrate and subsequent to the predicting for the substrate, details of etching of a substrate that is to be etched.

APPENDIX 9

The etching processing system according to any one of Appendix 1 to 8, wherein the processor is further configured to generate the trained model and to retrain the generated trained model when a predetermined condition is satisfied.

APPENDIX 10

A method of predicting etching quality includes predicting etching quality of a substrate by inputting image data of the substrate into a trained model trained by using training data in which image data of substrates captured by an imaging device arranged on a transfer path of the substrates and information for predicting etching quality of the substrates are associated with each other.

APPENDIX 11

A non-transitory storage medium of etching quality prediction storing a program causing a computer to implement a prediction includes predicting etching quality of a substrate by inputting image data of the substrate into a trained model trained by using training data in which image data of substrates captured by an imaging device arranged on a transfer path of the substrates and information for predicting etching quality of the substrates are associated with each other.

While the preferred embodiments and embodiments of the present disclosure have been described in detail above, the present disclosure is not limited to the embodiments and embodiments described above, and various modifications and substitutions may be made to the embodiments and examples described above without departing from the scope of the present disclosure.

What is claimed is:

1. An etching processing system comprising:
   a memory; and
   a processor coupled to the memory and configured to predict etching quality of a substrate by inputting image data of the substrate into a trained model trained by using training data in which image data of substrates captured by an imaging device arranged on a transfer path of the substrates and information for predicting etching quality of the substrates are associated with each other, wherein the trained model is trained by using the training data in which differential image data obtained as differences between pre-process image data obtained by imaging the substrates before undergoing etching and post-process image data obtained by imaging the substrates after undergoing etching is used as input data, and etching quality information obtained as differences between pre-process quality information obtained by inspecting the substrates before undergoing etching with respect to items related to etching quality of the substrates and post-process quality information obtained by inspecting the substrates after undergoing etching with respect to items related to etching quality of the substrates is used as supervisory data.

2. An etching processing system comprising:
   a memory; and
   a processor coupled to the memory and configured to predict etching quality of a substrate by inputting image data of the substrate into a trained model trained by using training data in which image data of substrates captured by an imaging device arranged on a transfer path of the substrates and information for predicting etching quality of the substrates are associated with each other, wherein the trained model includes:
   a first trained model in which training is performed using training data in which pre-process image data generated by capturing the image of the substrate before undergoing etching is input data and pre-process quality information output by performing inspection of an item related to etching quality of the substrate before undergoing etching is supervisory data; and
   a second trained model in which training is performed using training data in which post-process image data generated by capturing the image of the substrate after undergoing etching is input data and post-process quality information output by performing inspection of an item related to etching quality of the substrate after undergoing etching is supervisory data;
   wherein the processor is configured to predict etching quality of the substrate based on the pre-process quality information output by inputting the pre-process image data generated by capturing the image of the substrate before undergoing etching to the first trained model and the post-process quality information output by inputting the post-process image data generated by capturing the image of the substrate after undergoing etching to the second trained model.

3. The etching processing system according to claim 1, wherein the processor is further configured to predict, as the etching quality, at least one of a film thickness value, a CD value, and a value related to a cross-sectional shape of the substrate that has been subjected to the etching.

4. The etching processing system according to claim 1,
   wherein the items related to the etching quality include at least one of a film thickness value, a CD value, and a value related to a cross-sectional shape, and
   wherein the processor is configured to predict, as the etching quality, at least one of an etching amount, an etching rate, and a ACD value of the substrate that has been subjected to the etching.

5. The etching processing system according to claim 4, wherein the pre-process image data and the post-process image data are image data of a specific color component.

6. The etching processing system according to claim 1, further comprising a controller configured to control, based on the predicted etching quality of the substrate and subsequent to the predicting for the substrate, details of etching of a substrate that is to be etched.

7. The etching processing system according to claim 1, wherein the processor is further configured to generate the trained model and to retrain the generated trained model when a predetermined condition is satisfied.

8. A method of predicting etching quality comprising:
   predicting etching quality of a substrate by inputting image data of the substrate into a trained model trained by using training data in which image data of substrates captured by an imaging device arranged on a transfer path of the substrates and information for predicting etching quality of the substrates are associated with each other, wherein the trained model is trained by using the training data in which differential image data obtained as differences between pre-process image data obtained by imaging the substrates before undergoing etching and post-process image data obtained by imaging the substrates after undergoing etching is used as input data, and etching quality information obtained as differences between pre-process quality information obtained by inspecting the substrates before undergoing etching with respect to items related to etching quality of the substrates and post-process quality information obtained by inspecting the substrates after undergoing etching with respect to items related to etching quality of the substrates is used as supervisory data.

9. A non-transitory storage medium of etching quality prediction storing a program causing a computer to implement a prediction comprising:
   predicting etching quality of a substrate by inputting image data of the substrate into a trained model trained by using training data in which image data of substrates captured by an imaging device arranged on a transfer path of the substrates and information for predicting etching quality of the substrates are associated with each other, wherein the trained model is trained by using the training data in which differential image data obtained as differences between pre-process image data obtained by imaging the substrates before undergoing etching and post-process image data obtained by imaging the substrates after undergoing etching is used as input data, and etching quality information obtained as differences between pre-process quality information obtained by inspecting the substrates before undergoing etching with respect to items related to etching quality of the substrates and post-process quality information obtained by inspecting the substrates after undergoing etching with respect to items related to etching quality of the substrates is used as supervisory data.

* * * * *